(12) United States Patent
Akao et al.

(10) Patent No.: US 8,321,788 B2
(45) Date of Patent: Nov. 27, 2012

(54) INFORMATION PROCESSING APPARATUS, INFORMATION PROCESSING SYSTEM, AND INFORMATION PROCESSING METHOD

(75) Inventors: Masato Akao, Kanagawa (JP); Tetsujiro Kondo, Tokyo (JP); Kazutaka Ando, Kanagawa (JP); Yoshihito Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 12/507,951

(22) Filed: Jul. 23, 2009

(65) Prior Publication Data
US 2010/0026511 A1 Feb. 4, 2010

(30) Foreign Application Priority Data
Jul. 30, 2008 (JP) ................................ 2008-196613

(51) Int. Cl.
*G06F 3/00* (2006.01)
(52) U.S. Cl. .......................................... 715/708; 706/47
(58) Field of Classification Search ........................ None
See application file for complete search history.

(56) References Cited

U.S. PATENT DOCUMENTS
2009/0112852 A1* 4/2009 Kim et al. .......................... 707/5
2009/0319462 A1* 12/2009 Tirpak et al. ..................... 706/47

FOREIGN PATENT DOCUMENTS
| JP | 8-171433 | 7/1996 |
| JP | 10-11255 | 1/1998 |
| JP | 2002-108528 | 4/2002 |
| JP | 2004-272805 | 9/2004 |
| JP | 2007-300407 | 11/2007 |
| WO | WO 2007/145007 A1 | 12/2007 |

OTHER PUBLICATIONS
U.S. Appl. No. 12/476,814, filed Jun. 2, 2009, Akao, et al.

* cited by examiner

*Primary Examiner* — Boris Pesin
*Assistant Examiner* — Ayesha Huertas Torres
(74) *Attorney, Agent, or Firm* — Oblon, Spivak, McClelland, Maier & Neustadt, L.L.P.

(57) ABSTRACT

An information processing apparatus includes a pattern extraction unit, a rule extraction unit, and a reflection information generation unit. The pattern extraction unit is configured to extract an operation pattern of each of users from operation history information obtained from a plurality of devices to be operated, the operation history information at least including information regarding operation histories of the users and device states. The rule extraction unit is configured to extract incorrect operation patterns from the operation patterns extracted by the pattern extraction unit, the incorrect operation patterns being operation patterns caused by incorrect operations performed by the users. The reflection information generation unit is configured to identify a cause of the incorrect operations from types of the incorrect operation patterns and generate, based on the cause of the incorrect operations, reflection information configured to be reflected in functions of the devices to be operated.

13 Claims, 31 Drawing Sheets

13:00:00  RETURN
13:00:00  RETURN
13:00:10  MENU
13:00:11  MENU
13:00:15  DOWN
13:00:15  DOWN
13:00:15  DOWN
13:00:16  DOWN
13:00:19  SET
13:00:19  SET
13:00:28  RETURN
13:00:28  RETURN
13:00:33  UP
13:00:33  UP
13:00:38  SET
13:00:38  SET
13:00:43  DOWN
13:00:43  DOWN
. . .

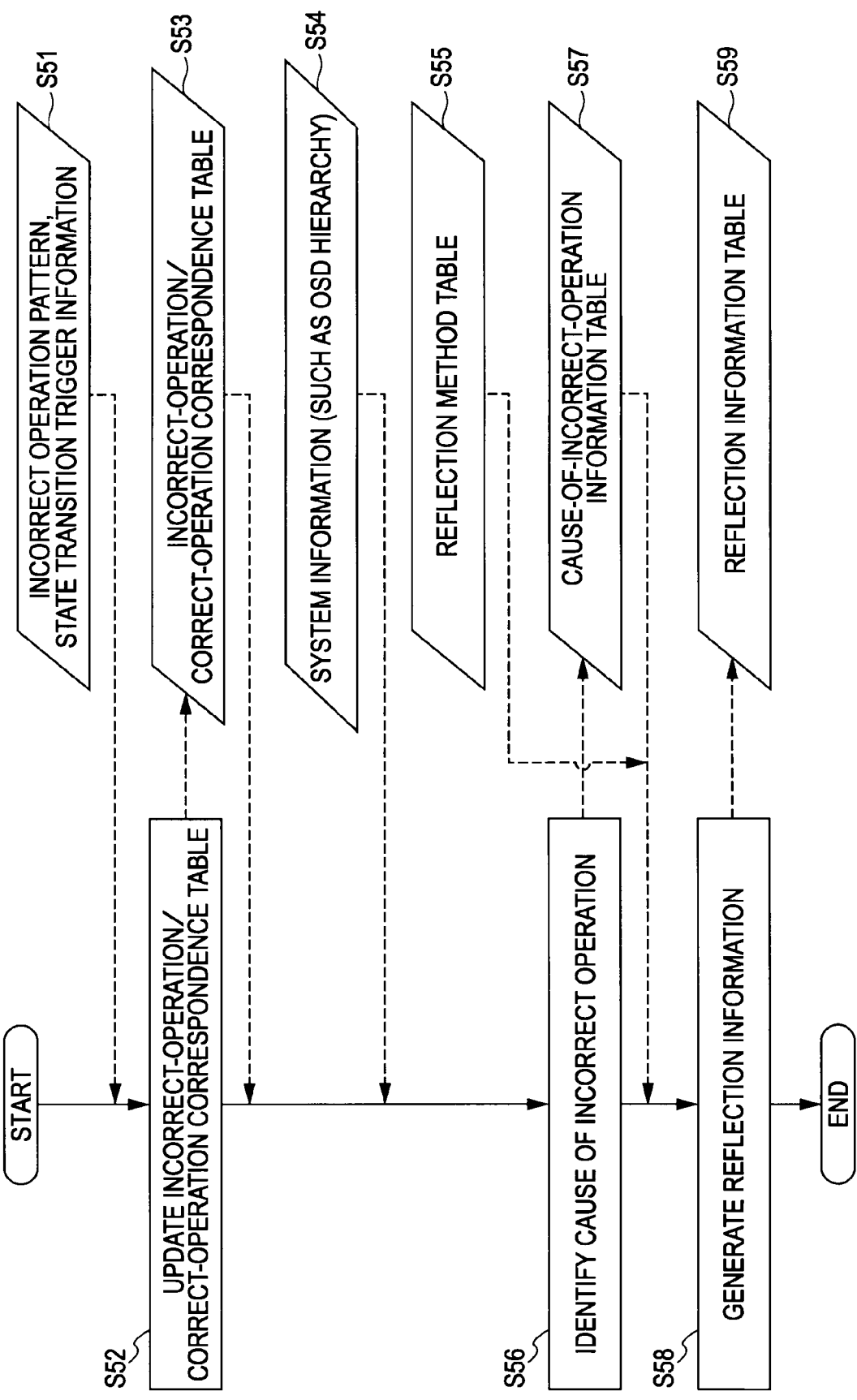

FIG. 16

INCORRECT-OPERATION/CORRECT-OPERATION CORRESPONDENCE TABLE

| STATE TRANSITION PATTERN | INCORRECT OPERATION | CORRECT OPERATION | CAUSE-OF-INCORRECT-OPERATION INFORMATION |
|---|---|---|---|
| MAIN MENU → IMAGE QUALITY SETTING MENU → TV SETTING MENU | IMAGE QUALITY SETTING MENU: IN | TV SETTING MENU: IN | MISUNDERSTANDING BETWEEN "TV SETTING MENU" AND "IMAGE QUALITY SETTING MENU" |
| TV SETTING MENU → BS SETTING MENU | BS SETTING MENU: IN | TERRESTRIAL SETTING MENU: IN | MISUNDERSTANDING BETWEEN "BS SETTING MENU" AND "TERRESTRIAL SETTING MENU" |
| ... | ... | ... | ... |

CAUSE-OF-INCORRECT-OPERATION INFORMATION TABLE

FIG. 17

| REFLECTION METHOD TYPE NUMBER | CAUSE OF INCORRECT OPERATION | REFLECTION METHOD |
|---|---|---|
| 0 | — | NO CHANGE |
| 1 | MISUNDERSTANDING OF MENU ITEMS | CREATION OF SHORTCUT TO CORRECT MENU IN INCORRECT MENU |
| 2 | MISUNDERSTANDING OF MENU ITEMS | INCONSPICUOUS DISPLAY OF INCORRECT MENU ITEM |
| 3 | MISUNDERSTANDING OF MENU ITEMS | DIRECT TRANSITION FROM INCORRECT MENU TO CORRECT MENU |
| ... | ... | ... |

FIG. 18

| TARGET | REFLECTION METHOD TYPE NUMBER | DETAILED REFLECTION METHOD |
|---|---|---|
| IMAGE QUALITY SETTING MENU | 1 | ADDITION OF SHORTCUT TO "TV SETTING MENU" |
| BS SETTING MENU | 2 | INCONSPICUOUS DISPLAY |
| ... | ... | ... |

FIG. 19

| TIME CONDITION | REFLECTION INFORMATION | | |
|---|---|---|---|
| | TARGET | REFLECTION METHOD TYPE NUMBER | DETAILED REFLECTION METHOD |
| AM | IMAGE QUALITY SETTING MENU | 1 | ADDITION OF SHORTCUT TO "TV SETTING MENU" |
| PM | IMAGE QUALITY SETTING MENU | 1 | ADDITION OF SHORTCUT TO "SOUND QUALITY SETTING MENU" |
| ALL DAY LONG | BS SETTING MENU | 2 | INCONSPICUOUS DISPLAY |
| ... | ... | ... | ... |

FIG. 21

INCORRECT-OPERATION/CORRECT-OPERATION CORRESPONDENCE TABLE

| STATE TRANSITION PATTERN | INCORRECT OPERATION | CORRECT OPERATION | CAUSE-OF-INCORRECT-OPERATION INFORMATION |
|---|---|---|---|
| INITIAL STATE → INITIAL STATE → MAIN MENU | RETURN BUTTON | MENU BUTTON | ERRONEOUS PRESSING DUE TO PROXIMITY BETWEEN "RETURN BUTTON" AND "MENU BUTTON" |
| INITIAL STATE → INITIAL STATE → MAIN MENU | MEMO BUTTON | MENU BUTTON | ERRONEOUS PRESSING DUE TO SIMILARITY IN ATTRIBUTE BETWEEN "MEMO BUTTON" AND "MENU BUTTON" |
| ... | ... | ... | ... |

CAUSE-OF-INCORRECT-OPERATION INFORMATION TABLE

FIG. 22

| REFLECTION METHOD TYPE NUMBER | CAUSE OF INCORRECT OPERATION | REFLECTION METHOD |
|---|---|---|
| 0 | — | NO CHANGE |
| 1 | PROXIMITY | INCREASE SPACE |
| 2 | SIMILARITY IN SIZE | CHANGE SIZE |
| 3 | SIMILARITY IN SHAPE | CHANGE SHAPE |
| 4 | SIMILARITY IN COLOR | CHANGE COLOR |
| ... | ... | ... |

FIG. 23

| TARGET | REFLECTION METHOD TYPE NUMBER | DETAILED REFLECTION METHOD |
|---|---|---|
| "RETURN BUTTON" "MENU BUTTON" | 1 | INCREASE SPACE THEREBETWEEN |
| "MEMO BUTTON" "MENU BUTTON" | 3 | CHANGE SHAPE OF "MEMO BUTTON" |
| "MEMO BUTTON" "MENU BUTTON" | 4 | CHANGE COLOR OF "MEMO BUTTON" |
| ... | ... | ... |

FIG. 24

| | REFLECTION INFORMATION | | |
|---|---|---|---|
| TIME CONDITION | TARGET | REFLECTION METHOD TYPE NUMBER | DETAILED REFLECTION METHOD |
| AM | "RETURN BUTTON" "MENU BUTTON" | 1 | INCREASE SPACE THEREBETWEEN |
| PM | "MEMO BUTTON" "MENU BUTTON" | 4 | CHANGE COLOR OF "MEMO BUTTON" |
| ... | ... | ... | ... |

FIG. 25

| BUTTON ID | ALLOCATED SIRCS CODE | POSITION (COORDINATES) | ATTRIBUTE | | |
|---|---|---|---|---|---|
| | | | SIZE | SHAPE | COLOR |
| 1 | MENU | (2, 6) | 2 | □ | GRAY 2 | ⋮ |
| 2 | RETURN | (4, 6) | 2 | □ | GRAY 2 | ⋮ |
| 3 | MEMO | (6, 6) | 2 | □ | GRAY 2 | ⋮ |
| 4 | POWER | (8, 6) | 2 | □ | GRAY 2 | ⋮ |
| 5 | UP | (5, 14) | 1 | ◁ | GRAY 3 | ⋮ |
| 6 | DOWN | (5, 18) | 1 | ▷ | GRAY 3 | ⋮ |
| 7 | LEFT | (3, 16) | 1 | ▽ | GRAY 3 | ⋮ |
| 8 | RIGHT | (7, 16) | 1 | △ | GRAY 3 | ⋮ |
| 9 | SET | (5, 16) | 2 | ○ | GRAY 1 | ⋮ |
| 10 | FAST-REWIND | (3, 9) | 2 | ○ | GRAY 1 | ⋮ |
| ⋮ | | | | | ⋮ |

FIG. 29

| USER | SEQUENTIAL RULES | | | | |
|---|---|---|---|---|---|
| | R1<br>INCREASE SPACE BETWEEN "RETURN BUTTON" AND "MENU BUTTON" | R2<br>INCREASE SPACE BETWEEN "RETURN BUTTON" AND "MEMO BUTTON" | R3<br>CHANGE COLOR OF "MEMO BUTTON" | R4<br>CHANGE SHAPE OF "RETURN BUTTON" | R5<br>CHANGE SIZE OF "POWER BUTTON" |
| U1 | 0 | 1 | 1 | 0 | 0 |
| U2 | 0 | 0 | 1 | 0 | 0 |
| U3 | 1 | 1 | 1 | 0 | 0 |
| U4 | 1 | 1 | 0 | 1 | 1 |
| U5 | 1 | 1 | 1 | 0 | 1 |
| TOTAL | 3 | 4 | 4 | 1 | 2 |

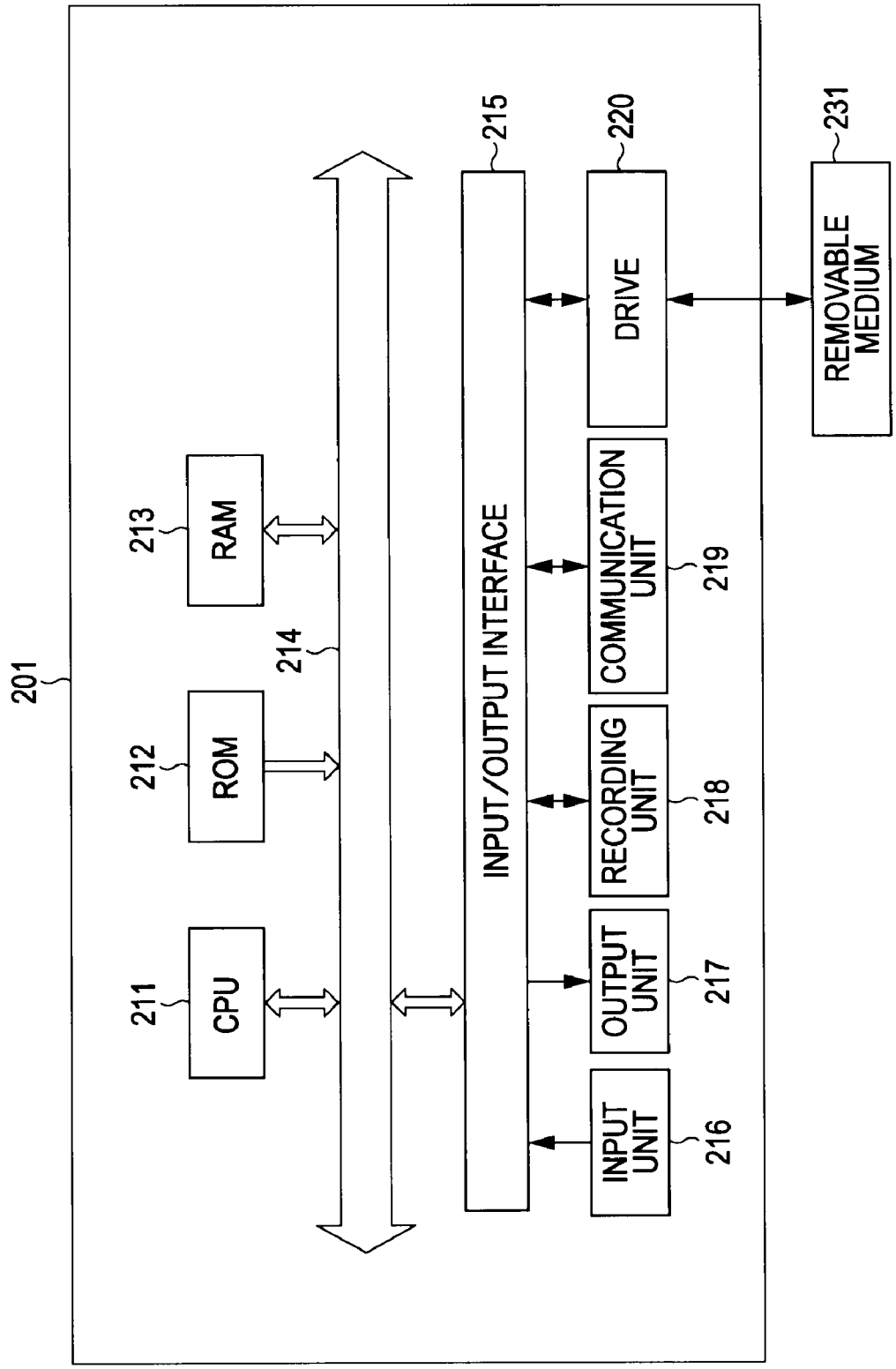

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method for providing a function for resolving user dissatisfaction with operations of devices using, for example, history information on incorrect operations by an arbitrary user.

2. Description of the Related Art

With the recent increase in audio-visual (AV) orientation, AV equipment with improved performance has been developed. In particular, television receivers and the like have a function for performing various types of image processing on the basis of user settings and allowing users to select desired image quality settings (such as color tone or sharpness of images). The improvement in performance of AV equipment, however, may increase the complexity of user operation and may cause many incorrect operations. In view of the situation of many incorrect operations, various methods for supporting user operation have been proposed.

For example, a method in which a remote controller operation signal is subjected to command analysis to detect an incorrect operation or an unnecessary operation and in which guidance information is presented has been proposed (see Japanese Unexamined Patent Application Publication No. 2007-300407).

Further, an operation support apparatus that predicts a purpose for a user from the operation on a device so that a user interface for supporting user operation can reflect the purpose has been proposed (see Japanese Unexamined Patent Application Publication No. 08-171443).

SUMMARY OF THE INVENTION

In the method described in Japanese Unexamined Patent Application Publication No. 2007-300407, operations with inexecutable commands and repeated operations with invariable internal parameters are hard-coded and defined in advance as incorrect operations. Whenever such operations occur, it is determined that incorrect operations have occurred. That is, potential occurrences of incorrect operations of users are predicted during development, and specialized incorrect-operation determination processes are hard-coded and prepared in advance. Further, since targets are general users rather than users who have performed incorrect operations, there is no "specialization" for an individual user who has performed an incorrect operation. Moreover, only the presentation of guidance information would make it difficult to directly resolve the cause of the incorrect operation.

In the apparatus described in Japanese Unexamined Patent Application Publication No. 08-171443, knowledge information for predicting operation states and operation purposes for a user is stored in advance, and an operation that is different from an operation predicted from the knowledge information is detected as a possible incorrect operation. That is, potential occurrences of incorrect operations of users are predicted during development, and specialized incorrect-operation determination processes are hard-coded and prepared in advance. Further, since targets are general users, there is no "specialization" for an individual user who has performed an incorrect operation. Moreover, only the presentation of guidance information would make it difficult to directly resolve the cause of the incorrect operation.

Further, a variety of processing mechanisms incorporated in AV equipment as described above allow multiple functions or services to be provided. However, due to the cost and the like, only functions chosen by manufacturers are incorporated in final products provided to users, and functions are limited in a set alone. This causes the users to purchase a set itself even for an update of the version of only a specific function in the set. In the techniques of the related art described above, there is another problem in that it is difficult to obtain and analyze information regarding what incorrect operation the users tend to perform, resulting in providing functions or products suited to individual user's preferences.

It is therefore desirable to improve a structure (user interface) of a device, which is susceptible to incorrect operation.

In an embodiment of the present invention, an information processing apparatus is configured to include a pattern extraction unit, a rule extraction unit, and a reflection information generation unit.

The pattern extraction unit extracts an operation pattern of each of users from operation history information obtained from a plurality of devices to be operated, the operation history information at least including information regarding operation histories of the users and device states.

The rule extraction unit extracts incorrect operation patterns from the operation patterns extracted by the pattern extraction unit, the incorrect operation patterns being operation patterns caused by incorrect operations performed by the users.

The reflection information generation unit identifies a cause of the incorrect operations from types of the incorrect operation patterns, and generates, based on the cause of the incorrect operations, reflection information configured to be reflected in functions of the devices to be operated.

In another embodiment of the present invention, an information processing system includes a device to be operated configured to accumulate information regarding an operation history of a user and a device state, and an information processing apparatus configured to analyze the information regarding the operation history and the device state.

The device to be operated includes an input unit, a signal processing unit, and a history storage unit.

The input unit generates a control signal based on an operation input of a user.

The signal processing unit processes the control signal input from the input unit.

The history storage unit stores, as operation history information, an operation history of the user and a state of the device obtained after the control signal is processed.

The information processing apparatus includes a pattern extraction unit, a rule extraction unit, and a reflection information generation unit.

The pattern extraction unit extracts an operation pattern of each of users from operation history information obtained from a plurality of devices to be operated, the operation history information at least including information regarding operation histories of the users and device states.

The rule extraction unit extracts incorrect operation patterns from the operation patterns extracted by the pattern extraction unit, the incorrect operation patterns being operation patterns caused by incorrect operations performed by the users.

The reflection information generation unit identifies a cause of the incorrect operations from types of the incorrect operation patterns, and generates, based on the cause of the incorrect operations, reflection information configured to be reflected in functions of the devices to be operated.

In another embodiment of the present invention, an information processing method includes the step of extracting an operation pattern of each of users from operation history information obtained from a plurality of devices to be operated, the operation history information at least including information regarding operation histories of the users and device states. The method also includes the steps of extracting incorrect operation patterns from the operation patterns, the incorrect operation patterns being operation patterns caused by incorrect operations performed by the users, and identifying a cause of the incorrect operations from types of the incorrect operation patterns. The method also includes the step of generating, based on the cause of the incorrect operations, reflection information configured to be reflected in functions of the devices to be operated.

In an embodiment of the present invention, an operation pattern of each user is extracted from obtained operation history information, and an incorrect operation pattern of each user is extracted from the extracted operation patterns. Accordingly, an incorrect operation pattern (sequential rule), which is difficult to recognize in the related art, is extracted. Then, based on the cause of the incorrect operation which is specified from the type of the incorrect operation patterns, reflection information to be reflected in the function of a device to be operated is generated so as to prevent the occurrence of an incorrect operation.

According to an embodiment of the present invention, therefore, information such as the histories of incorrect operations or the states of devices is analyzed, and reflection information for preventing the occurrence of an incorrect operation by a user is generated on the basis of the analysis result. The reflection information is reflected in a device to be operated. Thus, a structure (user interface) which is susceptible to incorrect operation can be improved.

BRIEF DESCRIPTION OF THE DRAWINGS

FIG. 6 is a diagram showing an example of operation history information according to an embodiment of the present invention;

FIG. 15 is a flowchart showing an example of a process (upper layer) performed by a reflection information generation unit according to an embodiment of the present invention;

FIG. 16 is a diagram showing an example of an incorrect-operation/correct-operation correspondence table and a cause-of-incorrect-operation information table (upper layer) according to an embodiment of the present invention;

FIG. 17 is a diagram showing an example of a reflection method table (upper layer) according to an embodiment of the present invention;

FIG. 18 is a diagram showing an example of a reflection information table (upper layer) according to an embodiment of the present invention;

FIG. 19 is a diagram showing an example of a reflection information table (upper layer) when a time-varying element is added;

FIG. 21 is a diagram showing an example of an incorrect-operation/correct-operation correspondence table and a cause-of-incorrect-operation information table (upper layer) according to an embodiment of the present invention;

FIG. 22 is a diagram showing an example of a reflection method table (lower layer) according to an embodiment of the present invention;

FIG. 23 is a diagram showing an example of a reflection information table (lower layer) according to an embodiment of the present invention;

FIG. 24 is a diagram showing an example of a reflection information table (lower layer) when a time-varying element is added;

FIG. 25 is a diagram showing an example of a remote-control attribute information table (lower layer) according to an embodiment of the present invention;

FIG. 29 is a diagram showing an example group-by-group upgrade according to an embodiment of the present invention;

FIG. 31 is a block diagram showing an example configuration of a general-purpose personal computer.

DESCRIPTION OF THE PREFERRED EMBODIMENTS

Exemplary embodiments of the present invention will be described hereinafter with reference to the accompanying drawings.

1. Overview of Information Processing System

An embodiment of the present invention provides an analysis technique of recorded data such as the operation histories of users or the states of devices, and more specifically, an implementation of this analysis technique, in view of operation, for the technique described in Japanese Unexamined Patent Application Publication No. 2004-265399, in particular, an information analysis unit or the like included in a center-side processor.

Figure 1:
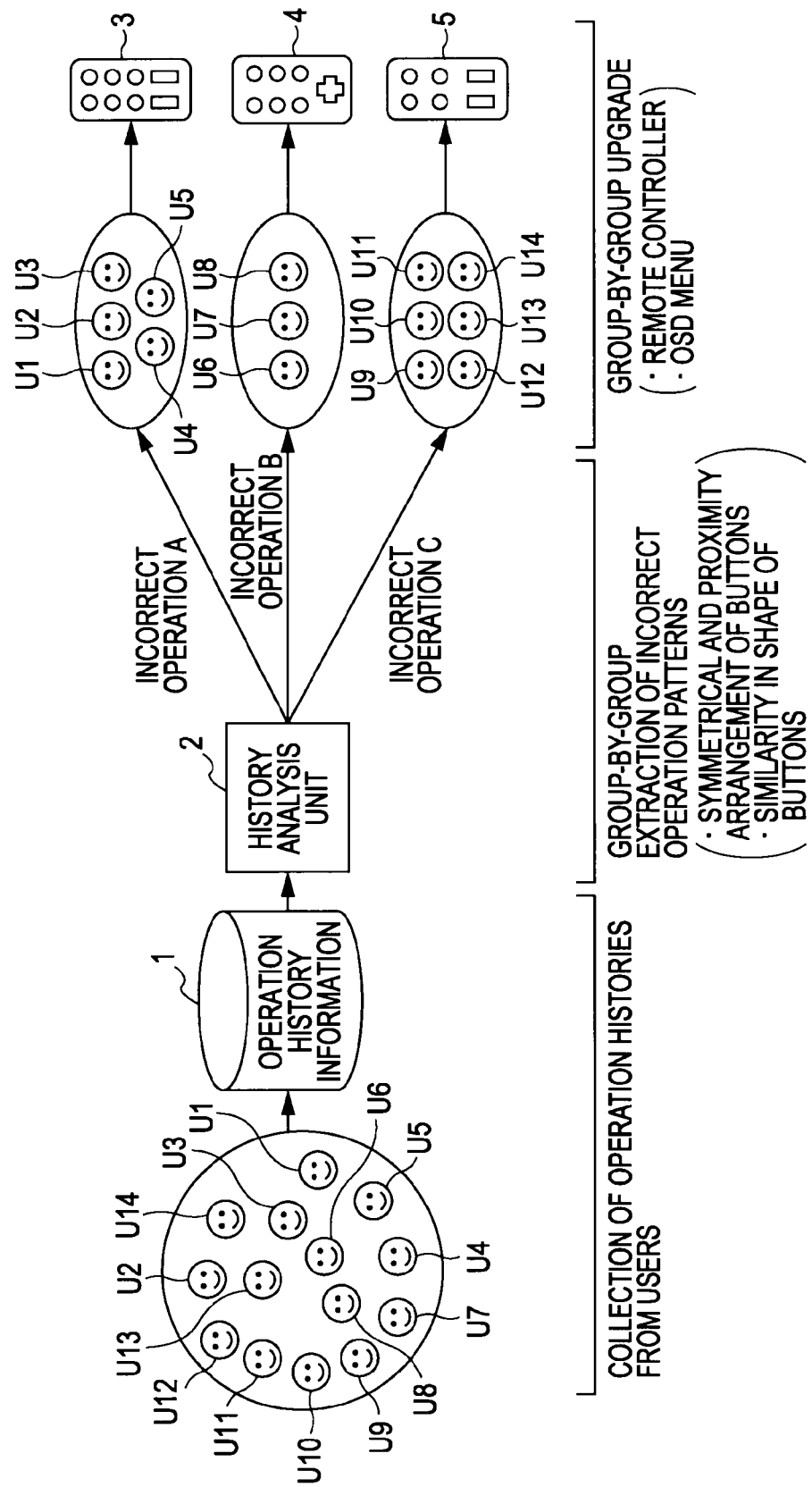
FIG. 1 is a diagram showing an overview of an information processing system for new function development according to an embodiment of the present invention.

FIG. 1 is a diagram showing an overview of an information processing system according to an embodiment of the present invention.

In the information processing system according to the embodiment, operation history information 1 regarding operations that have been performed on devices by a plurality of users U1 to U14 is collected. The collected operation history information 1 is analyzed by a history analysis unit 2 to extract incorrect operation patterns such as incorrect operation patterns A to C on a group-by-group basis. Groups are classified according to criteria such as the symmetrical and proximity arrangement of buttons on remote controllers (hereinafter also referred to as "remote control") and the similarity in shape of the buttons. Then, devices (for example, remote controllers 3, 4, and 5) are upgraded for each group (for example, each of the groups of users U1 to U5, users U6 to U8, and users U9 to U14) on the basis of the incorrect operation patterns A to C extracted by the history analysis unit 2. In this example, operation history information is collected from 14 users. In actuality, however, more users (devices) exist.

Thus, dissatisfaction (inconvenience) about user operation is predicted using incorrect-operation information commonly obtained from many users, and an upgrade is performed so as to reflect this dissatisfaction, thereby avoiding user dissatisfaction. For example, the remote controllers 3, 4, and 5 can be upgraded for, for example, each user group by changing the arrangement of buttons, the distance between buttons, the shape of a button, or the like. Examples of new functions that can be provided to users will be described below.

Further, a part of the type that is difficult in self-tuning (learning) can also be upgraded (a remote controller is reassembled). In addition, the specialization for each group rather than specialization for each individual can reduce the production cost.

In the following embodiment, it is assumed that a television set is used as a device on the user side. However, other electronic devices from which different pieces of operation history information can be collected depending on the use environment may be used, such as devices to which user operation may be applied or devices whose internal states may be characteristically changed.

Figure 2:
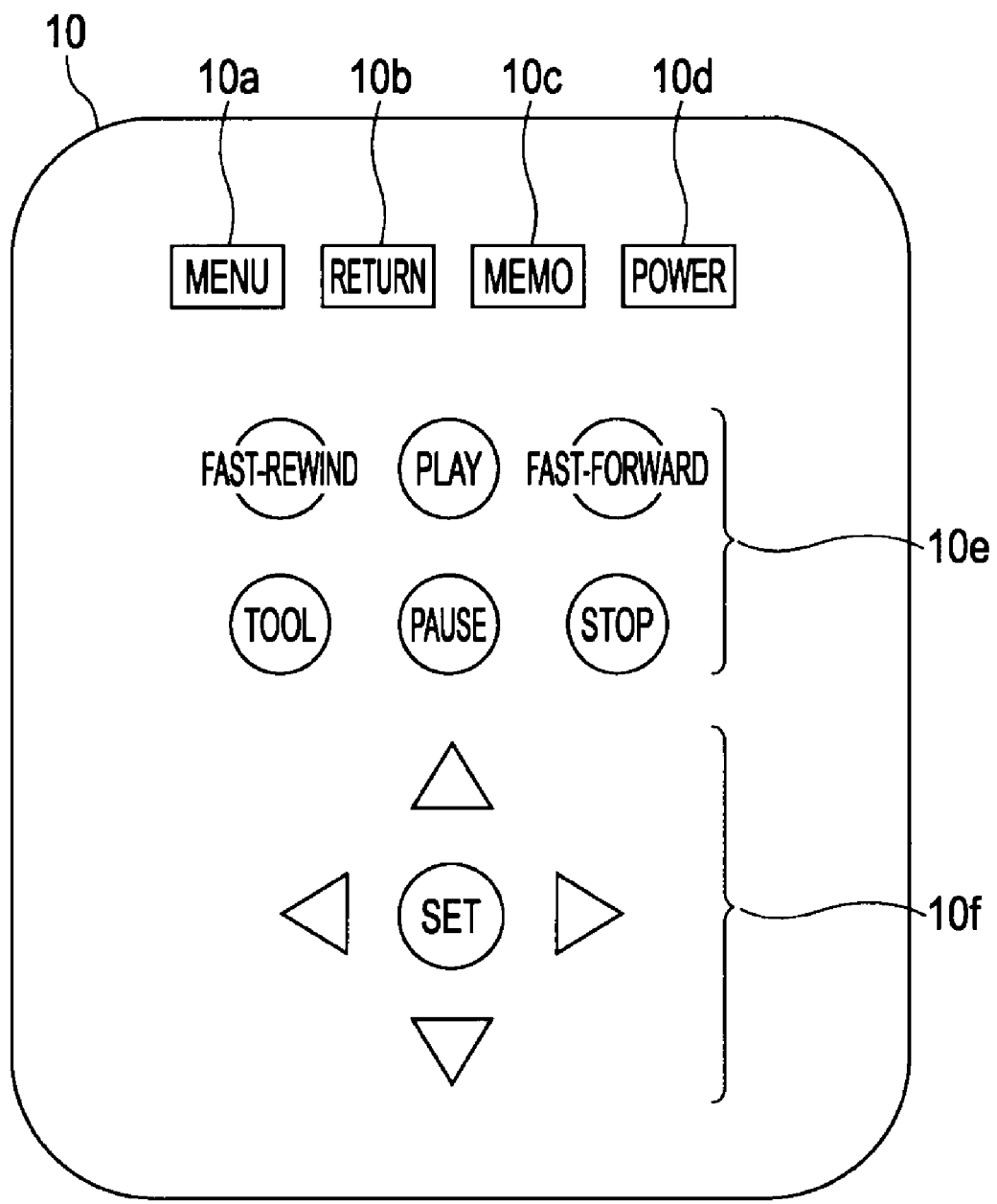
FIG. 2 is an external view showing an example of a remote controller (touch panel) according to an embodiment of the present invention.

FIG. 2 is a diagram showing an example of a remote controller (touch panel) 10 which will may serve as operation means in the following description.

The remote controller 10 shown in FIG. 2 is provided with a key input unit. The key input unit includes, for example, a menu button 10a, a return button 10b, a memo button 10c, a power button 10d, play buttons 10e, and direction buttons 10f.

The play buttons 10e include a fast-rewind button, a play button, a fast-forward button, a tool button, a pause button, and a stop button. The direction buttons 10f include up, down, left, and right direction buttons, and a set key disposed at the center of the four direction buttons. The types, arrangement, and the like of the buttons shown in FIG. 2 are examples, and other types, arrangements, and the like may be used.

Figure 3:
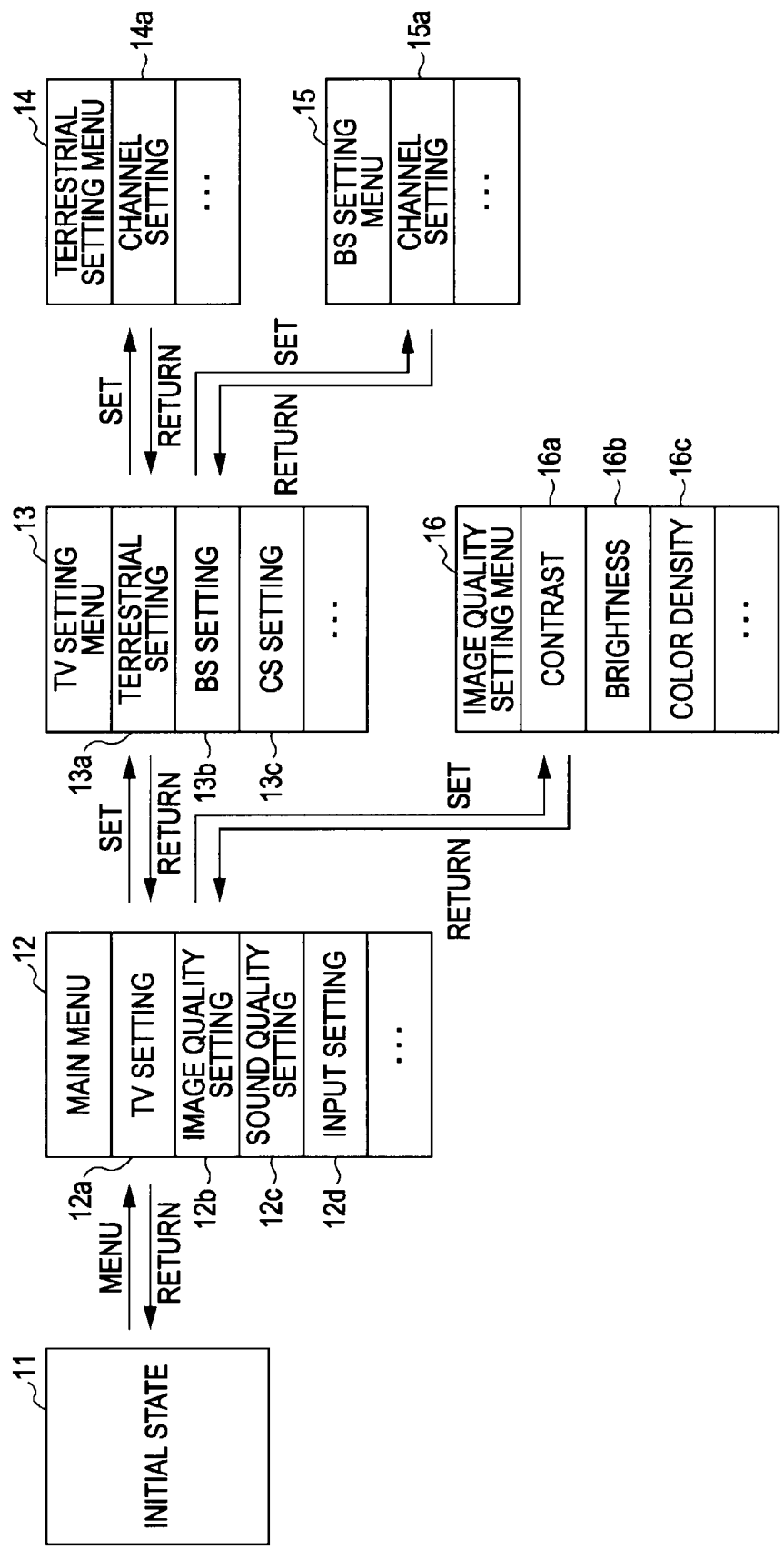
FIG. 3 is a diagram showing an example of OSD menus that are assumed in an embodiment of the present invention.

FIG. 3 is a diagram showing an example of an on-screen display (OSD) menu that is assumed in the following description.

For example, when the menu button 10a on the remote controller 10 is pressed in an initial state 11, in response to a control signal received from the remote controller 10, a device to be operated changes its state to a state where a main menu 12 is displayed as an OSD menu. The main menu 12 has a format in which pull-down menus are displayed as submenus, in which setting items such as a TV setting option 12a, an image quality setting option 12b, a sound quality setting option 12c, and an input setting option 12d are prepared. When the return button 10b is pressed in a state where the main menu 12 is being displayed, the state returns to the initial state 11.

Further, the TV setting option 12a in the main menu 12 is selected and set, resulting in a transition to a TV setting menu 13. The TV setting menu 13 includes, as pull-down menus, a terrestrial setting option 13a, a broadcast satellite (BS) setting option 13b, and a communications satellite (CS) setting option 13c.

Further, the terrestrial setting option 13a is selected and set, resulting in a transition to a terrestrial setting menu 14, in which a channel setting option 14a and the like are displayed as pull-down menus. Further, the BS setting option 13b is selected and set, resulting in a transition to a BS setting menu 15, in which a channel setting option 15a and the like are displayed as pull-down menus.

Further, the image quality option 12b in the main menu 12 is selected and set, resulting in a transition to an image quality setting menu 16, in which a contrast option 16a, a brightness option 16b, a color density option 16c, and the like are displayed as pull-down menus. The OSD menus displayed in FIG. 3 are examples, the details of which will be described below.

2. History Collecting Unit and History Analysis Unit (Common Sections) According to Embodiment A common section according to an embodiment of the present invention will now be described. That is, a shared part refers to a configuration and operation common to processing of upper and lower layers that are derived from operation history information.

Figure 4:
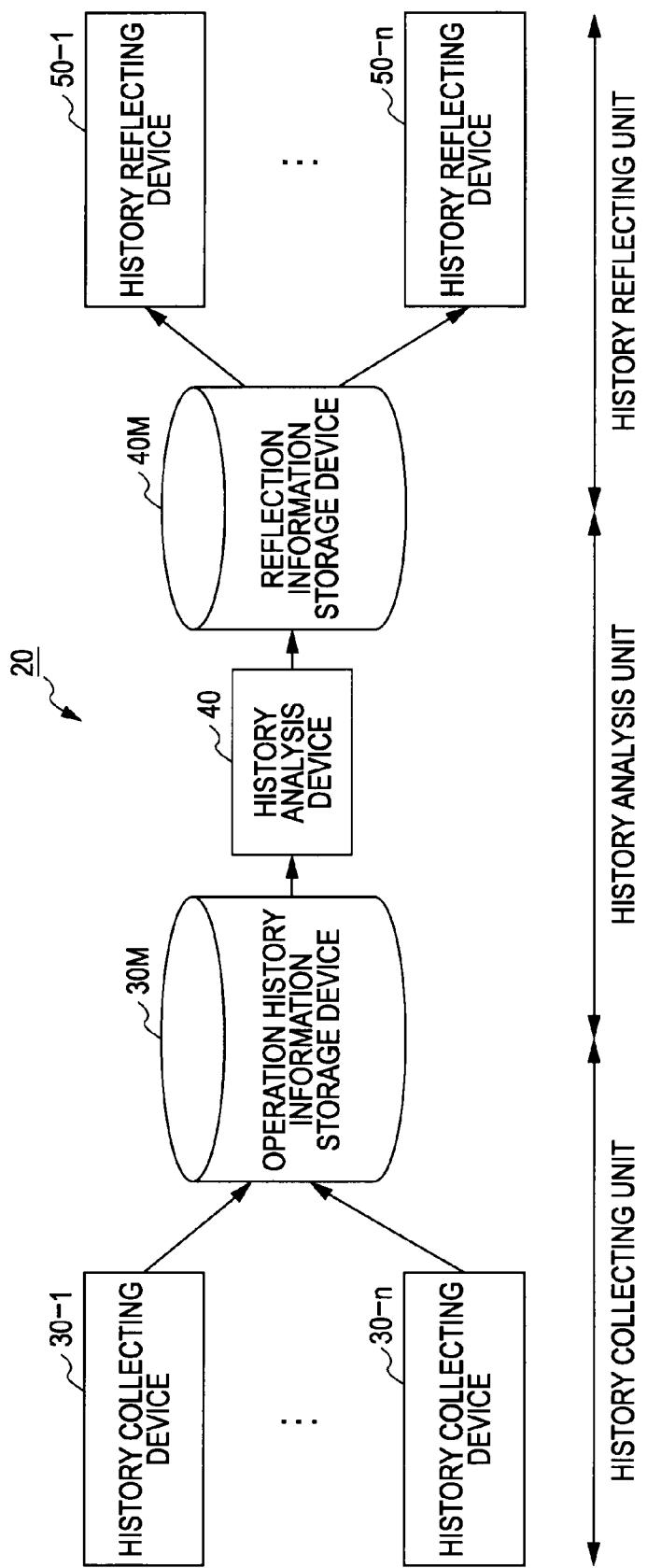
FIG. 4 is a diagram showing an example configuration of a system according to an embodiment of the present invention.

FIG. 4 is a schematic diagram showing an example configuration of an information processing system 20 according to an embodiment of the present invention. The information processing system 20 according to the present embodiment generally includes a history collecting unit including history collecting devices 30-1 to 30-n, a history analysis unit including a history analysis device 40, and a history reflecting unit including history reflecting devices 50-1 to 50-n. In general, the history collecting unit and the history reflecting unit are identical, but they may not necessarily be identical.

The history collecting unit is placed on the user side (such as in a home or an office). When a user uses a given device, the history collecting unit accumulates information regarding this device (such as operation history including an incorrect operation performed by the user, an input signal, states of the device). Each of the history collecting devices 30-1 to 30-n in the history collecting unit may be accommodated in a device such as a television receiver, or may be configured as a separate device. The history collecting devices 30-1 to 30-*n* are hereinafter collectively referred to as a "history collecting device 30", and the history collecting device 30 refers to each of the history collecting devices 30-1 to 30-*n* unless otherwise specified. Later, information accumulated in each history collecting device 30, that is, operation history information, is collected. The information may be collected via a network, by mailing a recording medium having the operation history information recorded thereon to a vendor (manufacturer), or using any other suitable method. The details of the history collecting device 30 will be described below.

The history analysis unit may be, for example, a (server) device placed in a center or the like of a vendor that develops products. The history analysis device 40 in the history analysis unit extracts incorrect operations on the basis of records such as operation histories or states of devices from an operation history information storage device 30M, and analyzes the incorrect operations. The operation history information storage device 30M stores operation history information including incorrect operations, which is sent from the history collecting devices 30-1 to 30-*n* of all users. The history analysis device 40 then extracts beneficial information (reflection information) that can be used for an upgrade. The beneficial information that can be used for an upgrade is saved in a reflection information storage device 40M. The details of the history analysis device 40 will be described below.

The history reflecting unit is placed on the user side (such as in a home or an office). The history reflecting devices 50-1 to 50-*n* in the history reflecting unit upgrade a device to be operated on the basis of upgrade information saved in the reflection information storage device 40M. For example, a device customized on the basis of the upgrade information may be provided to a user, or the upgrade information may be sent to a user (via a network) so that functions of the device of the user can be customized on the basis of the upgrade information. The history reflecting devices 50-1 to 50-*n* are hereinafter collectively referred to as a "history reflecting device 50", and the history reflecting device 50 refers to each of the history reflecting devices 50-1 to 50-*n* unless otherwise specified. The details of the history reflecting device 50 will be described below.

Configuration of History Collecting Unit

Figure 5:
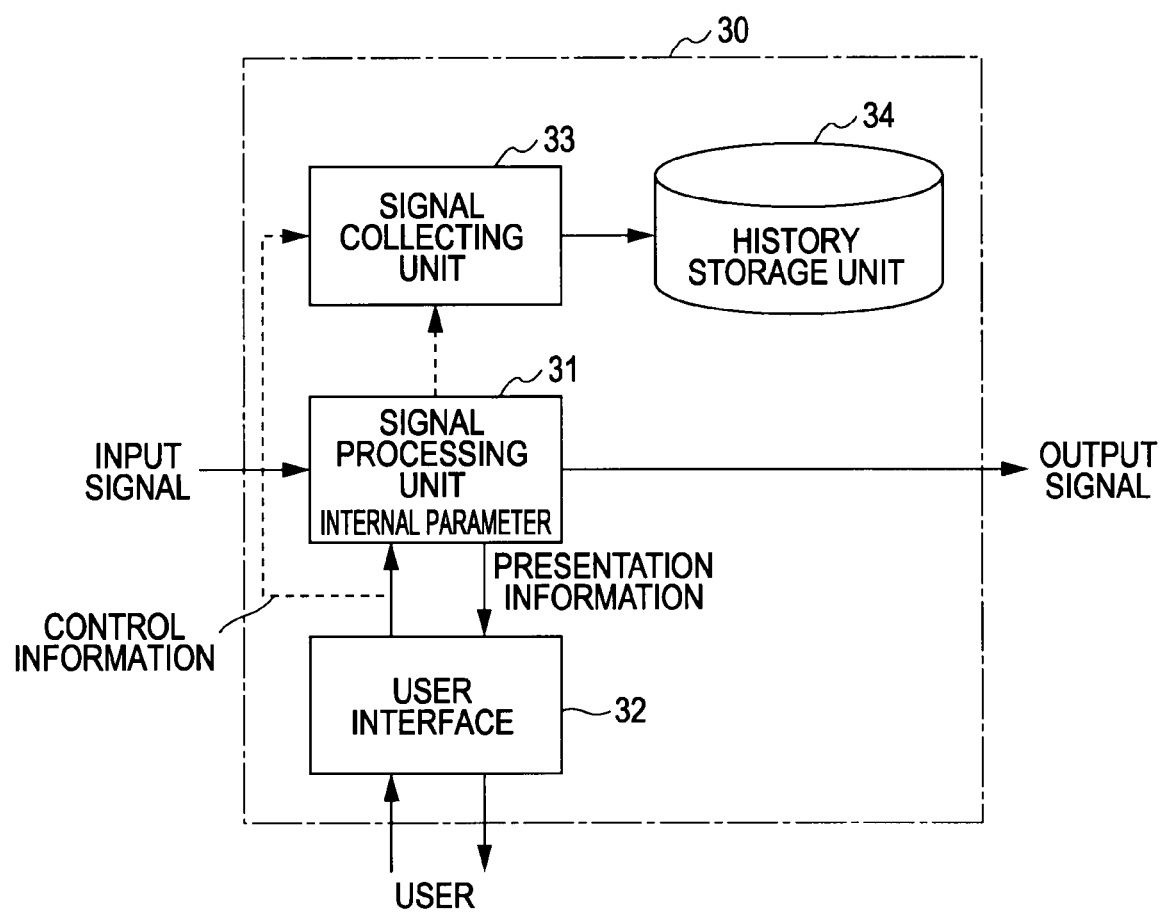
FIG. 5 is a diagram showing an overview of a history collecting unit (user device) according to an embodiment of the present invention.

FIG. 5 is a diagram showing the configuration of the history collecting unit in the information processing system 20.

The history collecting unit includes the history collecting device 30. The history collecting device 30 includes a signal processing unit 31, a user interface 32 (an input unit and an output unit), a signal collecting unit 33, and a history storage unit 34.

The signal processing unit 31 may be implemented by a digital signal processor (DSP), a central processing unit (CPU), or the like. The signal processing unit 31 performs predetermined processing on an input signal (such as a video signal or an audio signal) to produce presentation information, and supplies the presentation information to the user interface 32. The signal processing unit 31 further receives control information included in a signal input by a user using the remote controller 10 (see FIG. 2), and performs processing based on the control information.

The user interface 32 analyzes the signal input by the user using the remote controller 10, and outputs an analysis result, namely, control information, to the signal processing unit 31 and the signal collecting unit 33. Specifically, the user interface 32 may be a graphical user interface. A light receiving unit that receives an infrared signal from the remote controller 10 is provided as an interface.

The signal collecting unit 33 collects the control information (operation history) input from the user interface 32, the input signal input from the signal processing unit 31, and internal parameters (such as an input signal and a device state).

The history storage unit 34 may be a magnetic recording device, a semiconductor memory, or the like. The history storage unit 34 records and accumulates the information collected by the signal collecting unit 33.

In the history collecting unit having the configuration described above, the signal collecting unit 33 collects an electrical signal flowing in an electronic device (such as a television receiver) that is being used by a user. In the following, records of electrical signals to be collected are collectively referred to as an "operation history". The operation history represents user operation information itself and records of changes caused thereby in the internal state of the device.

For example, in a television set, as shown in FIG. 5, the signal collecting unit 33 detects control information sent from the user interface (such as a display unit such as a display or a light receiving unit) 32 to the signal processing unit 31, and an internal parameter of the signal processing unit 31. Examples of electrical signals to be collected include communication data between all integrated circuits provided in the device, such as infrared remote-control (serial infrared remote control system (SIRCS)) code, code flowing in an inter-integrated circuit (I2C) bus, which is used as records of the internal state of the device, and serial communication interface (SCI) communication code. However, any other information may be used.

After electrical signals (such as SIRCS code and I2C code) are collected, acquisition times and remote-control code types shown in FIG. 6 or any other suitable information items are combined to create operation history information 30A-1, and the operation history information 30A-1 is saved in the history storage unit 34. Although any type of information can be thoroughly collected as the operation history information 30A-1, only necessary operation history information is selected and saved for the saving in recording capacity. The above processes are repeated to accumulate operation history information in the history storage unit 34.

When the capacity of the history storage unit 34 becomes full, the user is prompted to replace the history storage unit 34, and the vendor (center) collects the history storage unit 34. The history storage unit 34 may also be collected in response to a request from the vendor (center) after a certain period of time has elapsed since the device was started to be used. The operation history information may be collected by causing the user to send the electronic device, or a removable history storage unit (by preparing a dedicated recording device or mounting a removable history storage unit in a remote controller), to the vendor (center). If the electronic device has a network connection function, accumulated operation history information may be sent to the vendor (center) via a network.

Operation of History Collecting Unit

Figure 7:
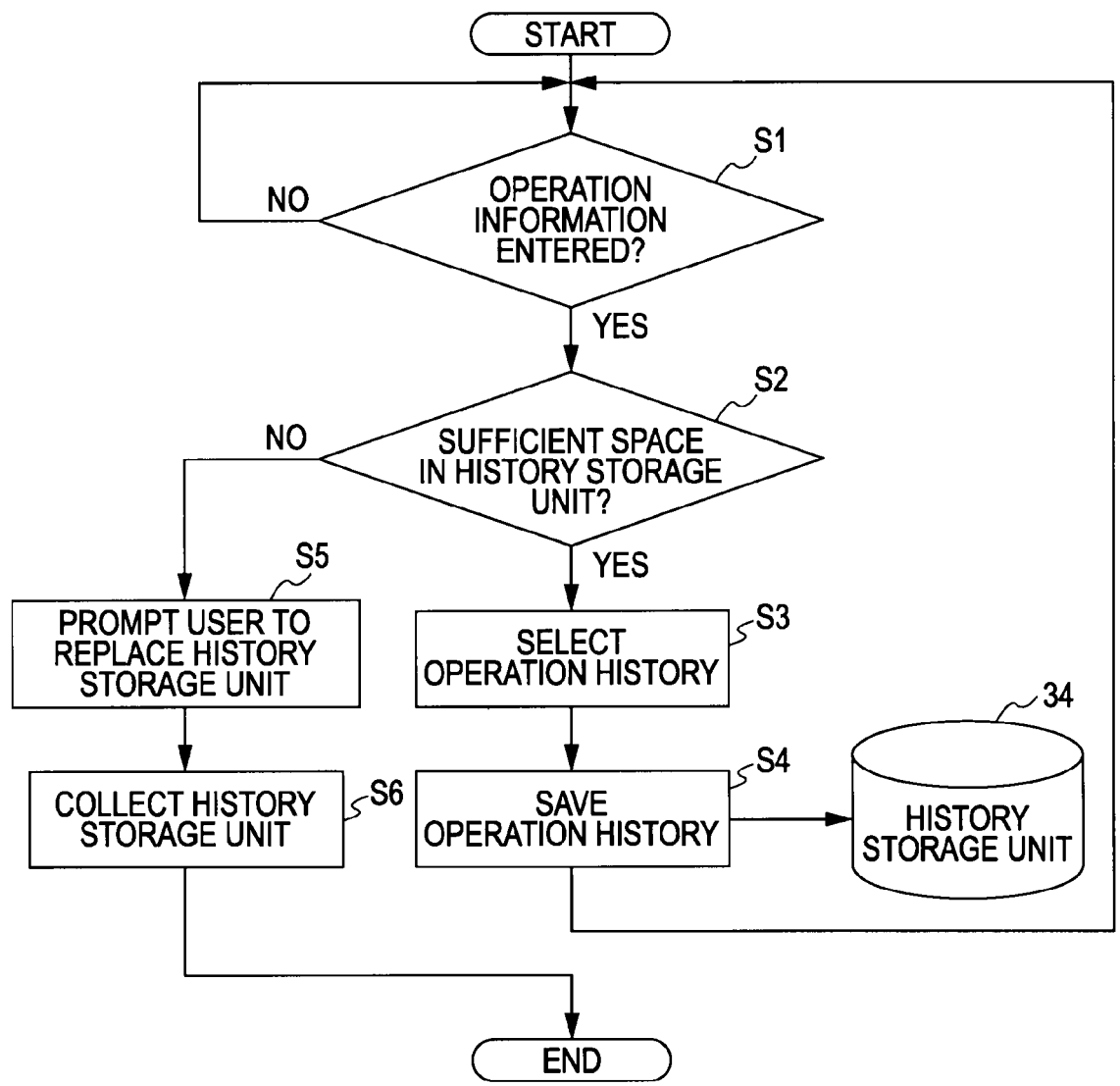
FIG. 7 is a flowchart showing an example of a process performed by the history collecting unit according to an embodiment of the present invention.

An example of the process performed by the history collecting unit (the history collecting device 30) in the information processing system 20 will be described with reference to a flowchart shown in FIG. 7.

When the process of collecting operation history information is started, first, in step S1, it is determined whether or not operation information has been input to the signal processing unit 31 by a user via the user interface 32. If operation information has been input, the process proceeds to step S2. If no operation information has been input, the processing of step S1 is repeatedly executed and the input of operation information is monitored.

In step S2, the signal collecting unit 33 determines whether or not there is a space in the history storage unit 34. If there is a space, the process proceeds to step S3. If there is no space, the process proceeds to step S5.

In step S3, the signal collecting unit 33 performs the selection of operation history information. Specifically, only operation history information among various types of information contained in the device is selected and saved. After this processing is completed, the process proceeds to step S4.

In step S4, the signal collecting unit 33 saves the operation history information in the history storage unit 34. After this processing is completed, the process returns to the determination of step S1, and the series of processing steps is repeated.

If it is determined in step S2 that there is no space in the history storage unit 34, the signal processing unit 31 performs control so that a message that prompts the user to replace the history storage unit 34 is displayed on the user interface 32.

In step S6, the operation history information accumulated in the history storage unit 34 is sent to the vendor (center) via a network. Alternatively, the user may provide the electronic device (the history collecting device 30) or the removable history storage unit 34 to the vendor (center).

Configuration of History Analysis Unit

Next, the history analysis unit that analyzes the operation history information collected by the history collecting unit will be described.

In the following description, the history analysis unit individually performs processing for each user. However, more advantageously, processing is performed collectively using data of as many users as possible, in particular, when a sequential rule extraction unit performs a process such as comparison between users.

Figure 8:
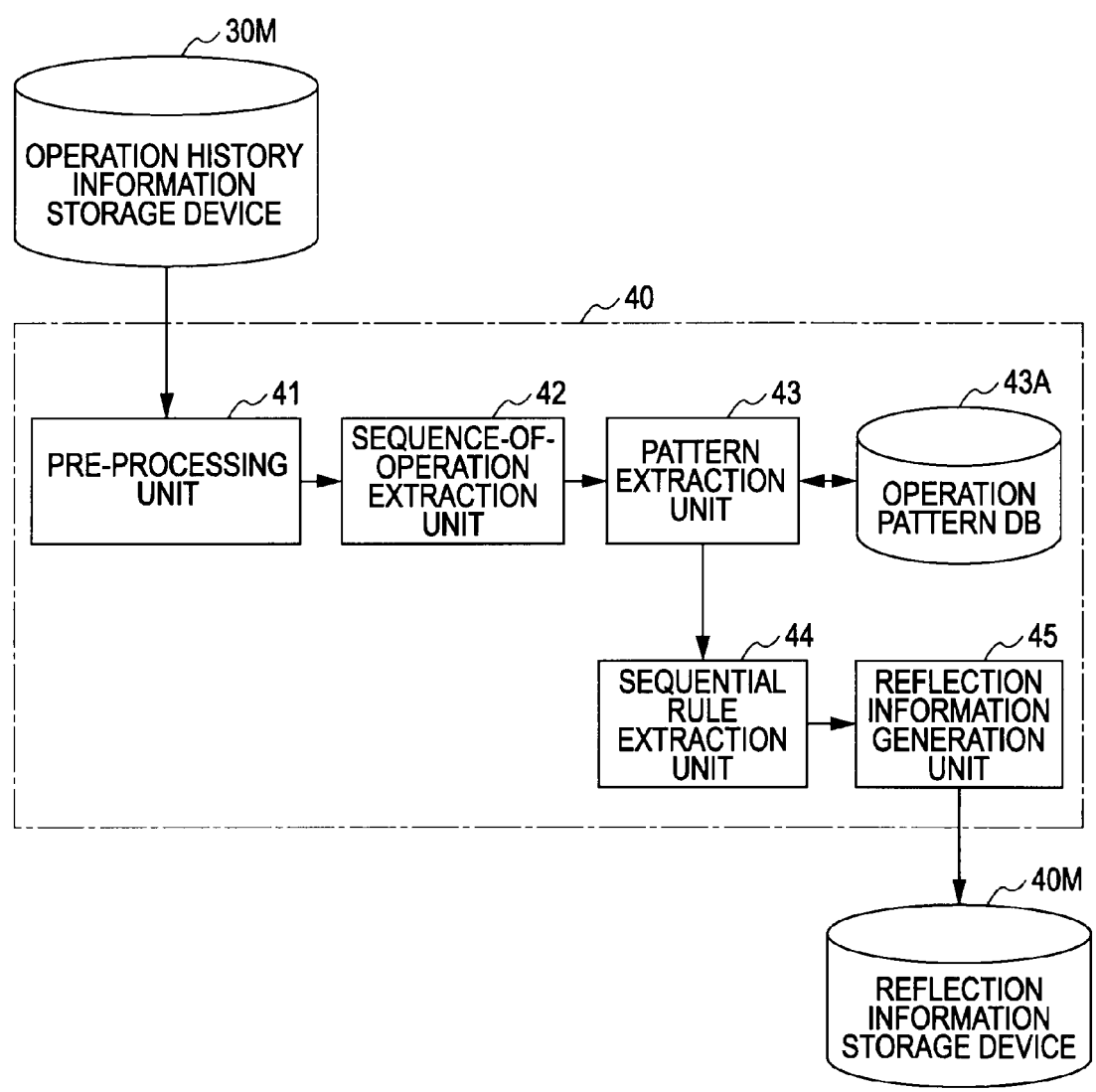
FIG. 8 is a block diagram showing an example internal configuration of a history analysis unit according to an embodiment of the present invention.

FIG. 8 is a diagram showing an example configuration of the history analysis unit in the information processing system 20.

The history analysis unit generally includes the operation history information storage device 30M, the history analysis device 40, and the reflection information storage device 40M. Each of the operation history information storage device 30M and the reflection information storage device 40M may be a non-volatile recording device such as a magnetic recording device or a semiconductor memory.

The history analysis device 40 includes a pre-processing unit 41, a sequence-of-operation extraction unit 42, a pattern extraction unit 43, an operation pattern database 43A, a sequential rule extraction unit 44, and a reflection information generation unit 45. Each unit of the history analysis device 40 may be implemented by a signal processing device such as a CPU, and is configured to perform predetermined processing on an input signal and output a resulting signal to the subsequent processing unit. The history analysis device 40 further includes a memory (not shown). Alternatively, each unit of the history analysis device 40 may invidiously include a memory for storing a result obtained by processing or calculation performed by this unit.

The pre-processing unit 41 is configured such that although various types of operation history information can be obtained depending on the specification of operation history information to be recorded on the operation history information storage device 30M, only information necessary for the subsequent analysis is extracted from the operation history information storage device 30M to configure the format (data form) of the operation history information. The details of the operation of the pre-processing unit 41 will be described below.

The sequence-of-operation extraction unit 42 is configured to extract aggregates of pieces of operation history information (sequences of operations) that can be predicted to have the same purpose from among pieces of operation history information over a long period of time, which have been pre-processed by the pre-processing unit 41. The operation of the sequence-of-operation extraction unit 42 will be described in detail below.

The pattern extraction unit 43 is configured to extract an operation pattern from each of the sequences of operations extracted by the sequence-of-operation extraction unit 42, and sum the operation patterns. The operation of the pattern extraction unit 43 will be described in detail below.

The operation pattern database 43A is configured such that the user's operation patterns extracted by the pattern extraction unit 43 are written, and is constructed as a non-volatile memory. The operation pattern database 43A is hereinafter represented by an "operation pattern DB 43A".

The sequential rule extraction unit 44 is configured to attach a significance to each of the operation patterns extracted by the pattern extraction unit 43 and extract information that can be used for an upgrade. The operation of the sequential rule extraction unit 44 will be described in detail below.

The reflection information generation unit 45 is configured to generate reflection information for allowing the device to reflect a new function using a reflection method of reflecting the information that can be used for an upgrade, which has been extracted by the sequential rule extraction unit 44, namely, in the present embodiment, incorrect operation patterns and corresponding operations, or any other suitable method. The reflection information is saved in the reflection information storage device 40M. The operation of the reflection information generation unit 45 will be described in detail below.

Operation of Each Unit of History Analysis Unit

An example of the process performed by each unit of the history analysis unit (history analysis device 40) in the information processing system 20 will now be described.

Operation of Pre-Processing Unit

An example of the process performed by the pre-processing unit 41 will be described with reference to a flowchart shown in FIG. 9.

When pre-processing is started, first, in step S11 (operation history decomposing process), the operation history information (see FIG. 6) collected in the operation history information storage device 30M is classified for each operation history code, and is sequentially subjected to the determination of step S12 for each operation history code.

In step S12 (remaining operation history determination process), it is determined whether or not unprocessed operation history information (operation history code) remains. If unprocessed operation history information (operation history code) remains, the process proceeds to step S13. If no unprocessed information remains, the pre-processing ends.

In step S13 (operation history type determination process), it is determined whether or not the unprocessed operation history information (operation history code) is operation history information (operation history code) that is necessary for the subsequent analysis, and only necessary operation history information is extracted. Then, the process proceeds to step S14. The remaining unnecessary operation history information is subjected to the processing of step S15. Since the operation history information is narrowed down in an operation pattern narrow-down process performed by the sequential rule extraction unit 44, the operation history information may not necessarily be narrowed down in this stage.

A specific example of converting collected operation history information into data used for analysis may be, for example, a process of removing a redundant operation history code from SIRCS code. In general, for stable communications, single pressing of a button allows a plurality of (in the following example, two) SIRCS commands to be sent. Thus, a redundant extra operation history code is removed. In another example, an operation history code that is not necessary for analysis may be removed. For example, when a menu operation is analyzed, unrelated operation history information (such as internal processing code of the device) is removed. Further, for example, if only operation history information relating to channel selection is necessary, other operation history information (such as audio volume adjustment and image quality adjustment) is removed.

Figure 10:
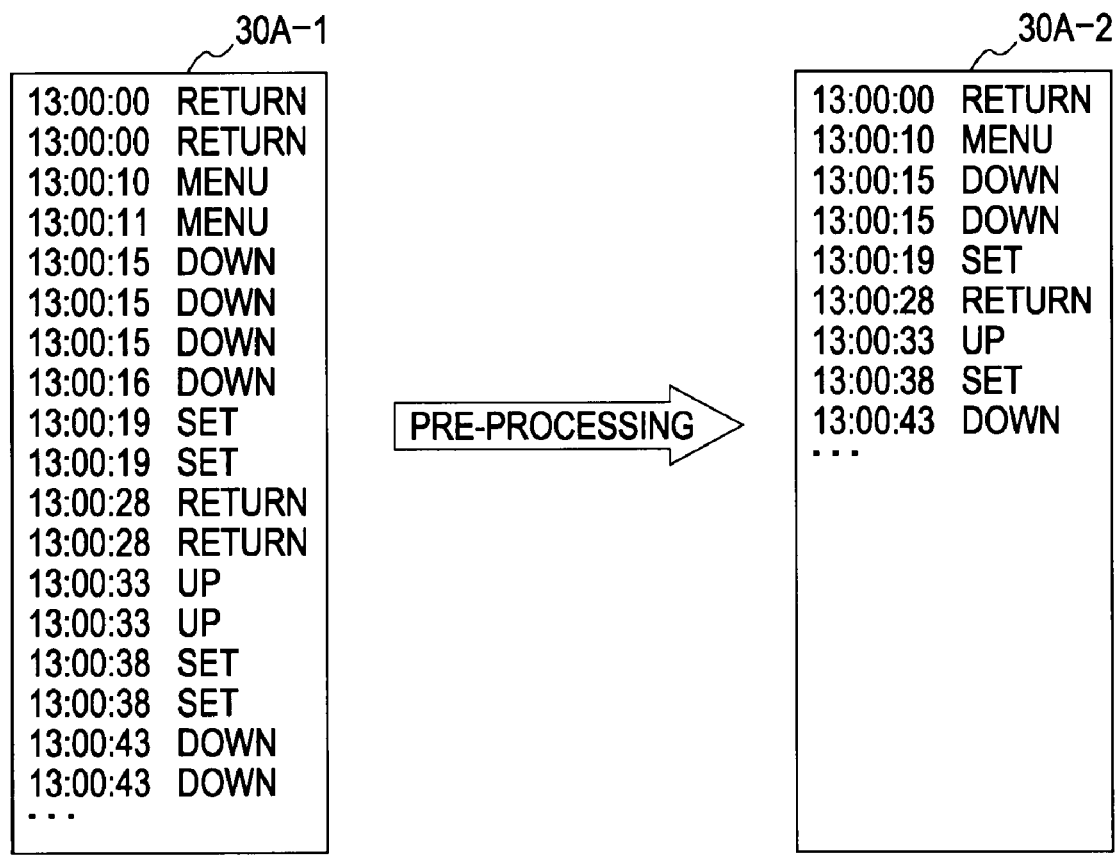
FIG. 10 is a diagram showing an example of pre-processed operation history information according to an embodiment of the present invention.

FIG. 10 shows an example of pre-processed operation history information. In the example shown in FIG. 10, the operation history information 30A-1 is pre-processed so that redundant operation history codes are removed to obtain operation history information 30A-2.

Figure 9:
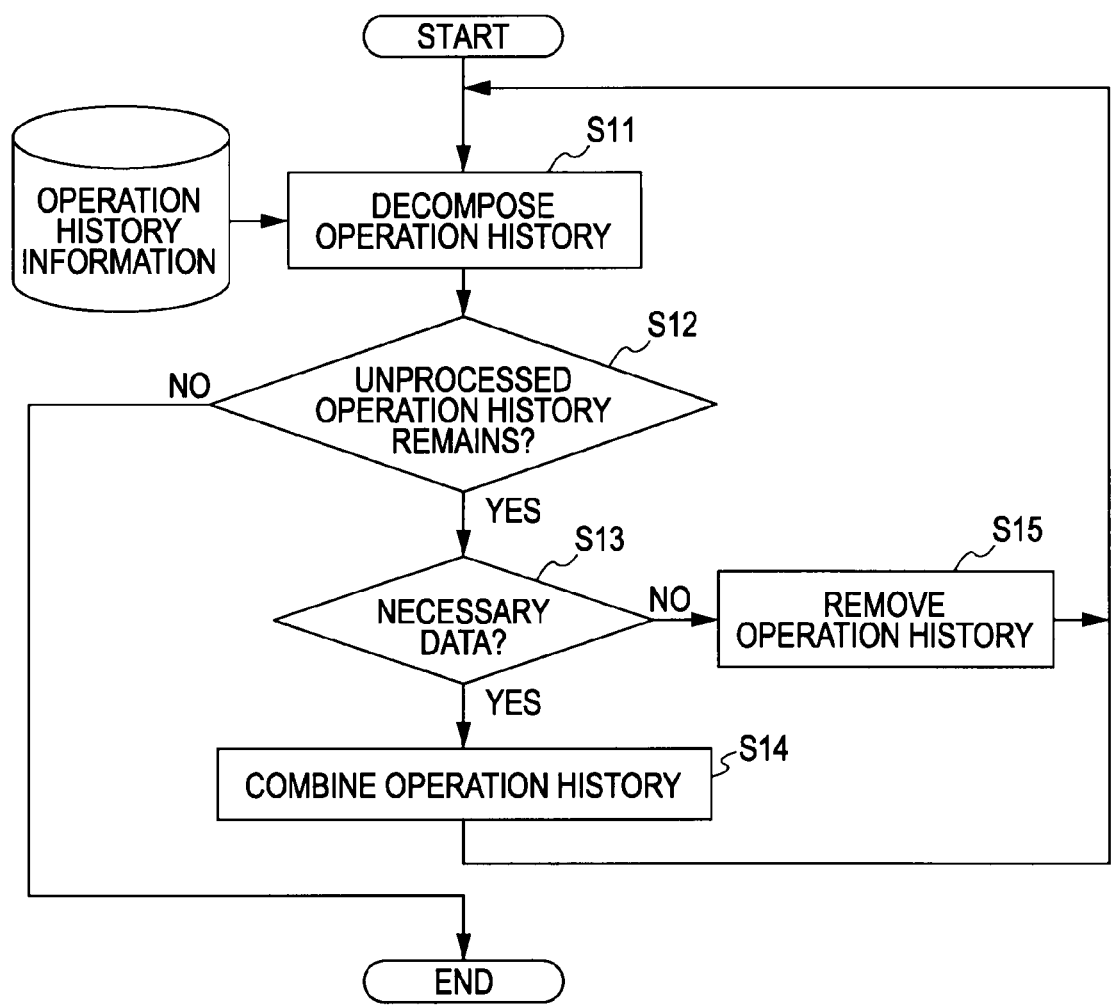
FIG. 9 is a flowchart showing an example of a process performed by a pre-processing unit according to an embodiment of the present invention.

Referring back to the flowchart shown in FIG. 9, in step S14 (operation history combining process), the operation history code subjected to the operation history type determination of step S13 is combined with the operation history codes that have been previously accumulated. After this processing is completed, the process returns to step S11 and the process repeats until all the operation history codes have been processed.

If it is determined in step S13 that the current operation history information is not necessary for analysis, then in step S15 (operation history removing process), the corresponding operation history information (operation history code) is removed. After this processing is completed, the process returns to step S11 and repeats the process until all the operation history codes have been processed.

Operation of Sequence-of-Operation Extraction Unit

An example of the process performed by the sequence-of-operation extraction unit 42 will be described with reference to a flowchart shown in FIG. 11.

When the operation extraction process is started, in step S21, first, the pre-processing unit 41 performs a sequence-of-operation extraction process on the pre-processed operation history information. In the sequence-of-operation extraction process, an operation history integrating process (step S21-1) and/or a delimiter position setting process (step S21-2) is performed. Alternatively, these processes are alternately repeated. After this processing is completed, the process proceeds to step S22.

In step S21-1 (operation history integrating process), pre-processed pieces of operation history information (operation history codes) that are adjacent or sufficiently close to each other are integrated according to various standards. For example, the following standards may be used in combination:

(1) The time of occurrence: Operation history codes at the same time are regarded as the same and are integrated.

(2) The type of operation history code: Operation history codes of the same types are integrated.

In the item (2) above, for example, in a television set, only "increase sound volume" codes may be integrated, or an "increase sound volume" code and a "decrease sound volume" code may be regarded as the same as the same and integrated. Accordingly, various integration methods can be selected in accordance with design as necessary.

Further, various integration methods can be selected, as necessary, by combining standards to be used for integration. For example, first, operation history codes at the same time and of the same types may be integrated, and, then, further integration may be performed in accordance with the type of the integrated operation history code. Such integration may be performed by alternately performing the processing of step S21-1 and the processing of step S21-2.

Figure 12:
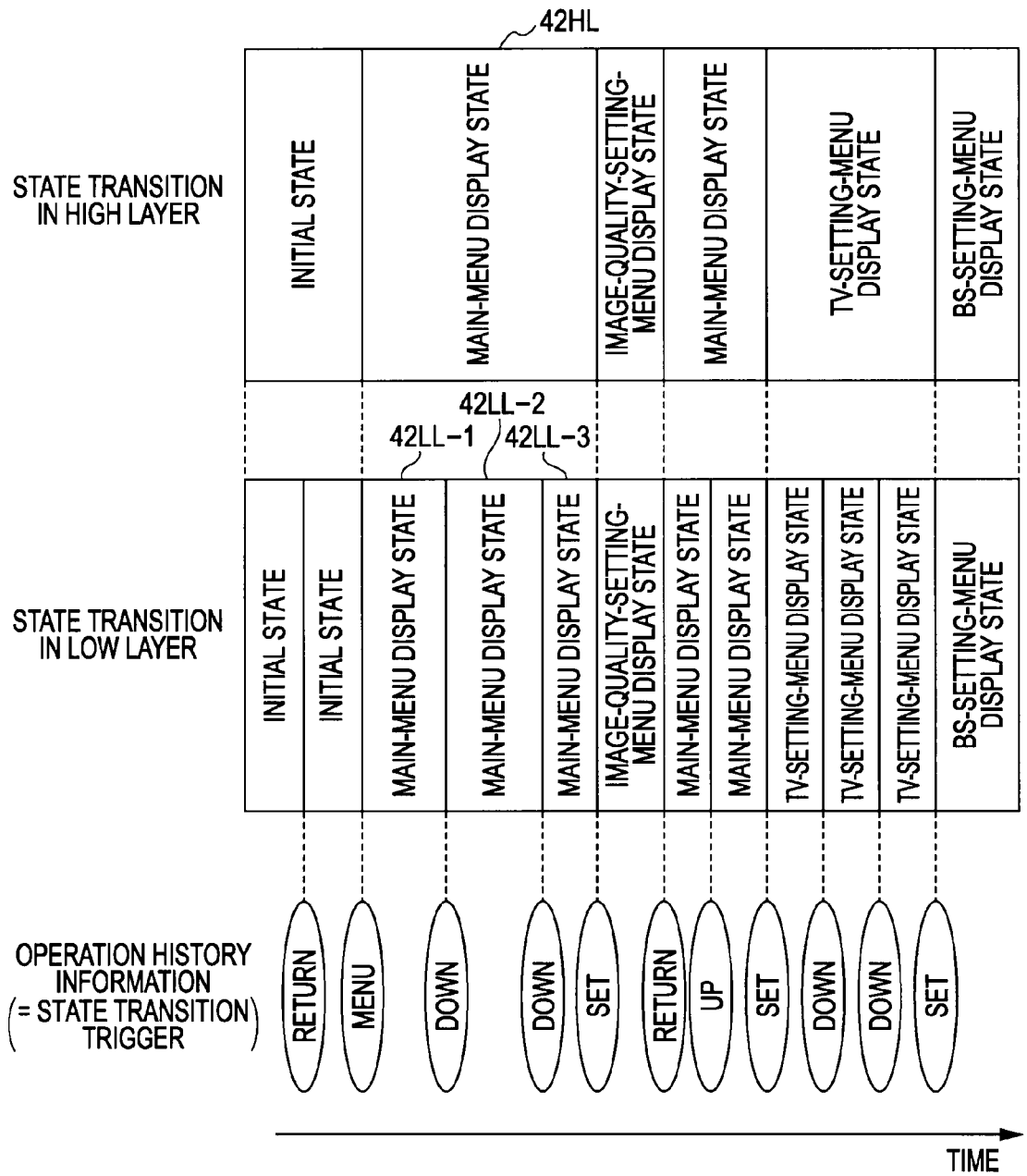
FIG. 12 is a diagram showing an example of extraction of a sequence of operations according to an embodiment of the present invention.

FIG. 12 shows an example of the integration of operation history codes.

In the present embodiment, operation history information is organized into hierarchical levels. For example, state transitions in two hierarchical levels (or layers) are assumed. Specifically, states in a lower layer (lower hierarchical level) and states in an upper layer (higher hierarchical level) are derived from pre-processed operation history information (remote-control codes). This integration of the operation history information is utilized for determining the type of an operation pattern that is obtained in the subsequent operation pattern analysis or defining a delimiter position by a delimiter position setting unit in the following stage.

In FIG. 12, pieces of operation history information that may be used as state-transition triggers, state transitions in the lower layer, and state transitions in the upper layer are illustrated.

The pieces of operation history information may be raw log data, and may correspond to the remote-control codes (SIRS codes), device internal processing codes, or the like described above.

The state transitions in the lower layer are the transitions of the states in the stage where a remote controller is operated, and are upper-level-concept-based representations of the operations assigned to the remote-control codes. Thus, even states whose appearances doe not change on a user interface are processed as different states.

The state transitions in the upper layer are the transitions of the states in the function stage, and their appearances from a user match the states. In other words, the states in the lower layer are grouped together for each same class (function). The state transitions in the upper layer may thus correspond to those in an OSD menu hierarchy, various processing modes (such as dual-screen display), or the like.

Figure 11:
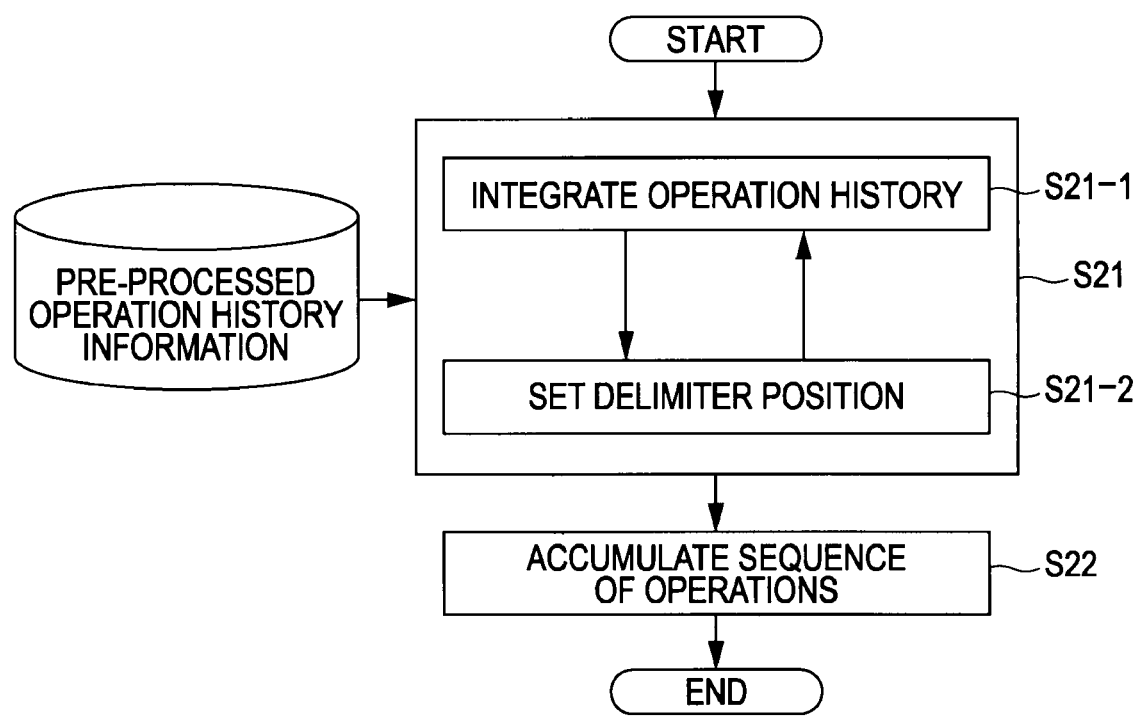
FIG. 11 is a flowchart showing an example of a process performed by a sequence-of-operation extraction unit according to an embodiment of the present invention.

Referring back to the flowchart shown in FIG. 11, in step S21-2 (delimiter position setting process), the pre-processed and integrated operation history code over a long period of time is grouped into an aggregate of operation histories (a sequence of operations) having the same purpose. For example, in a television set, if the brightness setting and the audio volume adjustment are performed in sequence, a delimiter is set between the sequence of operations relating to the brightness setting and the sequence of operations relating to the audio volume adjustment, and each of the sequences of operations is grouped as an aggregate of operation histories having the same purpose.

A delimiter position may be determined using, for example, but not limited to, the following standards in combination:

(1) A position between adjacent operation history codes that have not been integrated in the operation history integrating process.

In the example shown in FIG. 12, a delimiter position may be a position indicated by a wavy line. For example, delimiter positions may be the boundaries of pieces of operation history information, the boundaries of between main-menu display states 42LL-1, 42LL-2, and 42LL-3 in the lower layer, and the boundaries of a main-menu display state 42HL in the upper layer. The set of possible positions determined is represented by $S_A$.

(2) A position between adjacent operation history codes between which the time interval is greater than a threshold value δ.

The threshold value δ may be determined in advance as a value that is common to all the operation history codes or may be changed in accordance with the type of operation history code. If a threshold value is represented by δ, the set of possible positions determined is represented by $S_B(δ)$.

(3) A position immediately before an operation history code that appears only at the beginning or immediately after an operation history code that appears only at the end in a sequence of operations that is defined in the standard (or described in the instruction manual of the device being operated). The set of possible positions determined is represented by $S_C$.

(4) Use of the internal state of the device being operated.

For example, in a television set, the power-on or power-off position is actually examined using an I2C code or the like, and a delimiter position is set at the determined position or immediately after or before this position. The set of possible positions determined is represented by $S_D$.

For example, letting a large threshold value and a small threshold value be δb and δs, respectively, the set of delimiter positions can be determined by variously selecting the set of various combinations of product sets (∩) and sums of sets (∪) such as $(S_A \cap S_B(δ_S)) \cup S_B(δ_b)$.

After the completion of step S21, then, in step S22, the pre-processed operation history information is separated at the finally obtained delimiter position, and operation history codes are integrated as necessary. A sequence of operation patterns that is finally obtained is accumulated, and is supplied to the subsequent unit, namely, the pattern extraction unit 43.

In the example shown in FIG. 12, in the lower layer, the main-menu display states 42LL-1, 42LL-2, and 42LL-3 exist in association with the menu button, the down button, and the set button, respectively. In the upper layer, the main-menu display states 42LL-1, 42LL-2, and 42LL-3 in the lower layer are integrated into the single, main-menu display state 42HL.

Operation of Pattern Extraction Unit

Figure 13:
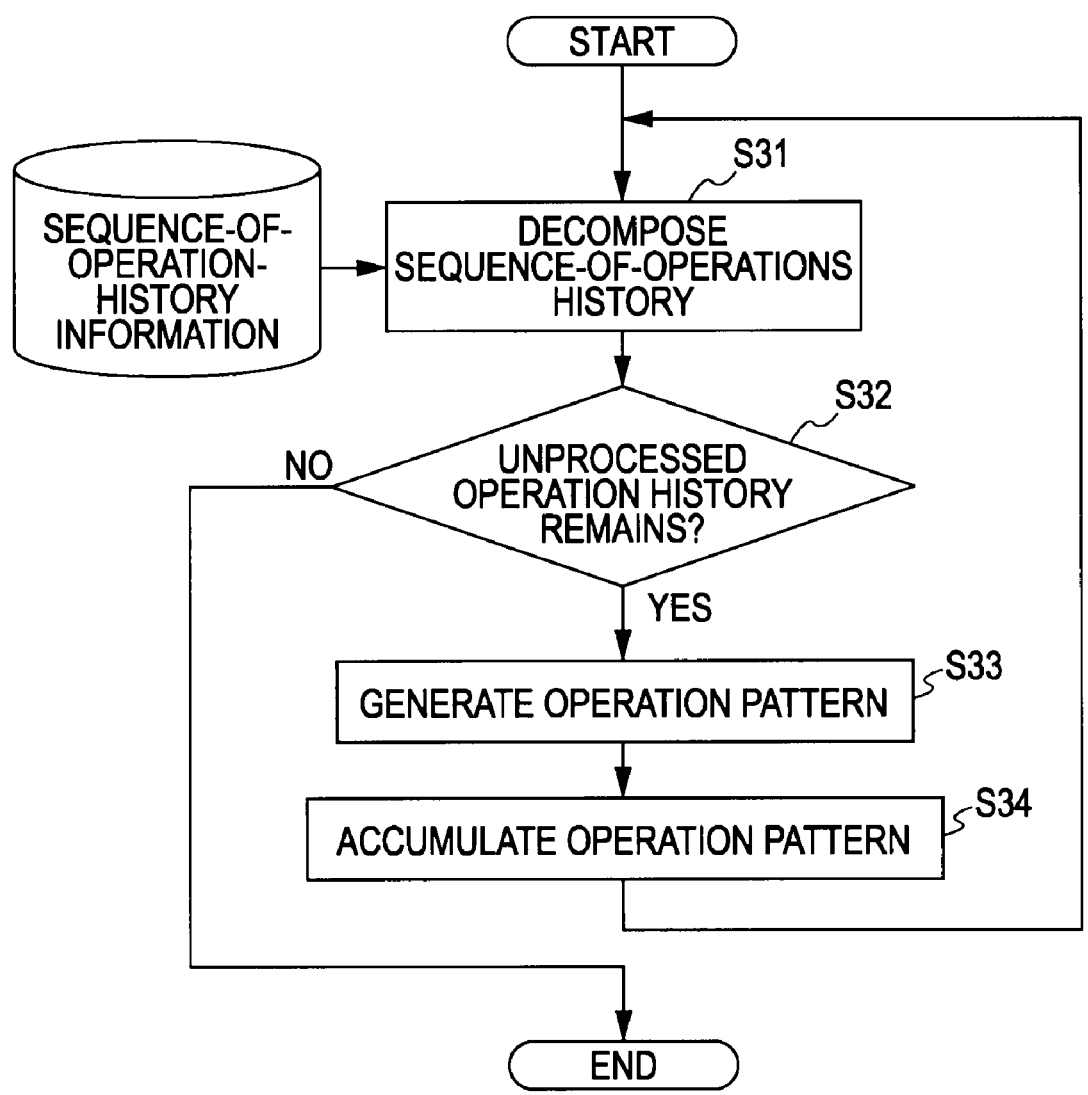
FIG. 13 is a flowchart showing an example of a process performed by an operation pattern extraction unit according to an embodiment of the present invention.

An example of the process performed by the pattern extraction unit 43 will now be described with reference to a flowchart shown in FIG. 13.

When a pattern extraction process is started, first, in step S31 (sequence-of-operation-history decomposing process) each sequence of operation history codes is decomposed on the basis of the delimiter positions set by the sequence-of-operation extraction unit 42, and is sequentially subjected to the determination of step S32.

In step S32 (remaining operation history determination process), it is determined whether or not unprocessed operation history information (unprocessed sequence of operation history codes) remains. If unprocessed operation history information (unprocessed sequence of operation history codes) remains, the process proceeds to step S33. If no unprocessed information remains, the pattern extraction process ends.

In step S33 (operation pattern generating process), an operation pattern is extracted from the sequence of operation history codes. An operation pattern may be extracted by selecting, for example, the following methods, as necessary:

(1) An operation pattern is extracted from the start position of a range that can take N successive operations from each of M sequences of operations (where M is an integer), where M>N, N being a fixed integer. Other extraction such as extracting only the first or last N successive operations in each sequence of operation may also be performed. In the following description, for example, but not limited to, two successive operations are used. Three successive operations or the like may be used.

(2) Each sequence of operations is set, as it is, as one operation pattern.

In step S34 (operation pattern accumulating process), the operation patterns obtained in the operation pattern generation process in step S33 are sequentially accumulated in a memory (not shown). The accumulated operation patterns are supplied to the subsequent unit, namely, the sequential rule extraction unit 44. After this processing is completed, the process returns to step S31 and the process repeats until all the operation history codes have been processed.

Operation of Sequential Rule Extraction Unit

Figure 14:
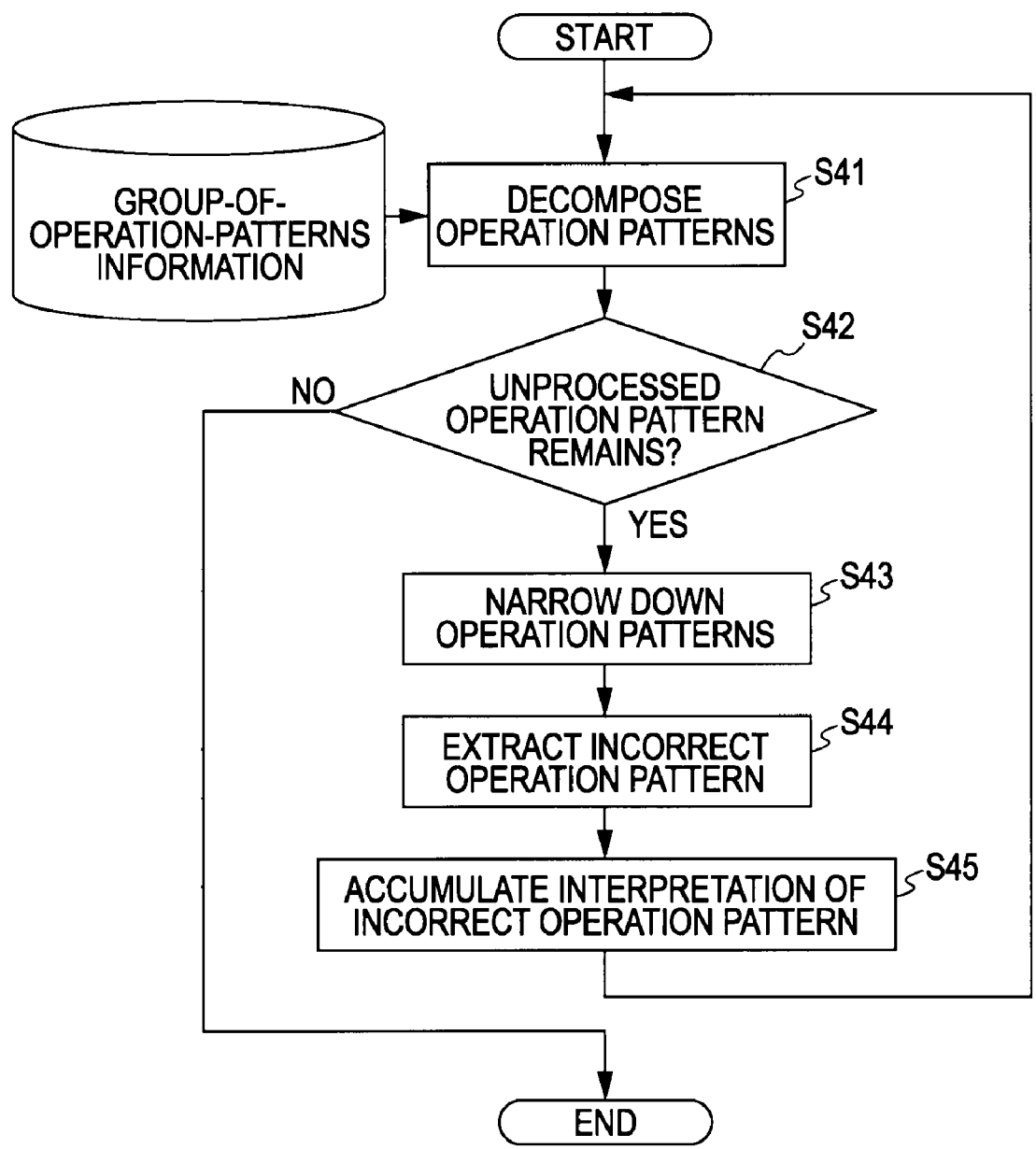
FIG. 14 is a flowchart showing an example of a process performed by a sequential rule extraction unit according to an embodiment of the present invention.

An example of the process performed by the sequential rule extraction unit 44 will now be described with reference to a flowchart shown in FIG. 14.

When a sequential rule extracting process is started, sequential first, in step S41 (operation pattern decomposing process), the operation patterns obtained by the pattern extraction unit 43 are decomposed into individual operation patterns, and each of the operation patterns is sequentially subjected to the remaining operation pattern determination of step S42.

In step S42 (remaining operation pattern determination process), it is determined whether or not an unprocessed operation pattern remains. If an unprocessed operation pattern remains, the process proceeds to an operation pattern narrow-down process in step S43. If no unprocessed operation pattern remains, the sequential rule extracting process ends.

In step S43 (operation pattern narrow-down process), if the number of operation patterns obtained by the pattern extraction unit 43 is within an acceptable range that can be handled, the process passes through step S43 without performing a narrow-down process. However, if the number of operation patterns is too large to be handled, for example, the standards below are used in combination as narrow-down conditions to narrow down the operation patterns. For the convenience of description, it is assumed that an operation pattern that meets the condition "an operation (or operations) A is followed by or causes an operation (or operations) B" is used.

(a) Statistic: the Following Indices are Available by Way of Example:

Frequency: the frequency of occurrence of an operation pattern. The operation patterns are narrowed down by setting an upper or lower limit value.

Certainty: the probability of occurrence of the operation (or operations) B, given the occurrence of the operation (or operations) A. This index corresponds to conditional probability "P(B/A)", and represents the degree of association between the operation (or operations) A and the operation (or operations) B. The operation patterns are narrowed down by setting an upper or lower limit value.

Lift value: the measure of effect of the occurrence of the operation (or operations) A on the occurrence of the operation (or operations) B. This index corresponds to "P(B/A)/P(B)". If the calculation result is greater than 1, it is determined that the current operation pattern is a particularly significant operation pattern. The operation patterns are narrowed down by setting an upper or lower limit value.

(b) Type of Operation History Code:

The operation patterns are narrowed down to only operation patterns necessary for the history reflecting unit (see FIG.

4) in the upgrade system, or a biased frequency of occurrence of an operation pattern is corrected, resulting in a more effective narrow-down process based on the statistic described above.

(c) Time of Occurrence:

The operation patterns are narrowed down by time period according to the number of days elapsed since the device being operated was started to be used or any other time condition. This allows analysis of changes in an operation pattern with time.

After the above processing is completed, the process proceeds to step S44.

In step S44 (incorrect operation pattern extracting process), an operation pattern that has possibly been caused by a user's incorrect operation is extracted as a reflection information item from among the narrowed-down operation patterns. For example, the operation of a remote controller for a television set is analyzed. In this case, it is assumed that only operation patterns having a high certainty and a high lift value are extracted in the operation pattern narrow-down process in step S43.

Then, an incorrect operation pattern is extracted from the extracted operation patterns. For example, the following incorrect operation patterns can be defined depending on their type:

(1) "State A→State C→State A→State B", where B≠C.

(2) "State A→State A→State B", where the first and second operations have common characteristics.

(3) "State A→State C". This operation pattern has a low certainty, and a similar, high-certainty operation pattern of "State A→State B" also exists.

The term "incorrect operation pattern" as used herein means an operation pattern that is different from an intended operation pattern, that is, an operation pattern that is not included in specified patterns. The specified patterns may be operation patterns that are described in an instruction manual or the like in order to execute a desired function and that can be specified in advance. An operation pattern that is thought by a user to be incorrect is not extracted as an incorrect operation pattern if this operation pattern is included in the specified patterns. The specified patterns are stored in a non-volatile memory. The non-volatile memory may be implemented by, for example, a memory that stores the operation pattern DB 43A, or any other suitable device.

The operation pattern of the item (1) above corresponds to a pattern of canceling an operation that has been performed (pressing a "return" button, a "cancel" button, or the like) and performing an operation for a transition to another state. This operation pattern can be interpreted as a pattern obtained as a result of the incorrect operation of "State A→State C" although the operation of "State A→State B" is originally intended.

The operation pattern of the item (2) above corresponds to a modified version of the pattern of the item (1), in which no state change has occurred due to an incorrect operation. This operation pattern corresponds to, for example, an operation that is not related to the menu or the like.

The operation pattern of the item (3) above corresponds to a pattern obtained by analysis from a history containing usual operations of a user, which is saved in the operation pattern DB 43A, in which although high-probability state transitions exist, a similar, low-probability state transitions have occurred. For example, in a state where a program on Channel 1 is being displayed, the Channel-3 button has been pressed although the pressing of the Channel-2 button normally occurs with high probability.

In the following description, the incorrect operation pattern of the item (1) above is used by way of example. After an incorrect operation pattern is extracted, the cause of occurrence thereof is derived. The cause can be defined in advance from the relationship between the pattern of "State A→State B" and the pattern of "State A→State C". When this operation is performed using a remote controller, the cause of occurrence can be the spatial positional relationship (proximity and/or symmetrical arrangement) between buttons, the similarity in shape of buttons, or the like. In the case of an OSD menu, the cause of occurrence can be the positional relationship between items or the like.

For example, although state transitions such as "State A→State B" are initially intended among out-of-specification operation patterns with a high frequency and a high certainty, the button may be erroneously pressed because a button used for the transition to State B and a button used for the transition to State C are located in close proximity to each other. The erroneous pressing of the button may cause state transitions such as "State A→State C (→State B)". An erroneous pressing of the button on a remote controller may also be caused by any other reason such as the symmetrical arrangement of buttons or the same shape of buttons.

Then, in step S45 (incorrect operation pattern interpretation accumulating process), the interpretations of the individual incorrect operation patterns obtained in the incorrect operation pattern extracting process in step S44 are accumulated and are used as information to be utilized in the history reflecting unit in the upgrade system. For example, operation patterns that are interpreted as patterns caused by a user erroneously pressing a button on a remote controller (incorrect operation patterns) are accumulated. Accordingly, features (sequential rules) regarding incorrect operations performed by the user are extracted. For example, findings are obtained such that a certain user often presses an incorrect button due to the symmetrical arrangement of buttons or no occurrence of an incorrect operation pattern after a certain period of time along a time axis leads to the interpretation that the user has gotten used to the operation of the remote controller. Consequently, for example, the following pieces of reflection information (information necessary for an upgrade) are output.

(1) Frequent occurrence of an incorrect operation caused by the proximity arrangement of buttons. →The distance between buttons is increased.

(2) A group associated with frequent occurrence of an incorrect operation caused by the symmetrical arrangement of buttons. →The arrangement of buttons is assigned so as not to cause a symmetrical arrangement.

(3) A group associated with frequent occurrence of an incorrect operation caused by the similarity in shape of buttons. →The shape of a button is changed.

An example of reflection information that is output in order to customize buttons on a remote controller will be described below.

The reflection information generation unit 45 (see FIG. 8) will now be described in further detail.

The reflection information generation unit 45 generates reflection information on the basis of, mainly, an incorrect operation pattern extracted in the upper layer of the operation history information (erroneous selection of the function) and an incorrect operation pattern extracted in the lower layer of the operation history information (erroneous pressing of the button). The reflection information generation unit 45 will now be described separately in the context of the upper and lower layers of operation history information (see FIG. 12).

3. History Analysis Unit (Reflection Information Generation Unit: Upper Layer) According to Embodiment First, the operation of the reflection information generation unit 45 for the upper layer will be described with reference to FIGS. 15 to 19.

FIG. 15 is a flowchart showing an example of the process performed for the upper layer of the operation history information by the reflection information generation unit 45 of the history analysis device 40.

When a reflection information generating process is started, first, in step S51, the reflection information generation unit 45 reads an incorrect operation pattern and information regarding state transition triggers. The incorrect operation pattern has been obtained in the previous incorrect operation pattern extracting process (step S44) performed by the sequential rule extraction unit 44. After this processing is completed, the process proceeds to step S52.

In step S52, the reflection information generation unit 45 updates an incorrect-operation/correct-operation correspondence table from the incorrect operation pattern and the information regarding state transition triggers. After this processing is completed, the process proceeds to step S53.

In step S53, the reflection information generation unit 45 saves the updated incorrect-operation/correct-operation correspondence table in a memory (not shown). After this processing is completed, the process proceeds to steps S54 and S55.

For example, in the example shown in FIG. 12, the state transitions in the upper layer, which are obtained from the operation history information, are "initial state"→"main-menu display state"→"image-quality-setting-menu display state"→"main-menu display state"→"TV-setting-menu display state"→"BS-setting-menu display state". Thus, the following incorrect operation patterns with two state transitions (=erroneous selection of the function) are extracted from operation history information in the upper layer:

(1) A pattern of "State A→State C→State A→State B" with a high frequency, a high certainty, and a high lift value This pattern corresponds to the transitions of, in the example shown in FIG. 3, for example, "the main menu 12"→"the image quality setting menu 16"→"the main menu 12"→"the TV setting menu 13".

(2) A pattern of "State A→State C" with a high frequency, a low certainty, and a high lift value, where this user is also associated with a pattern of "State A→State B" with a high frequency, a high certainty, and a high lift value.

This pattern corresponds to the transitions of, in the example shown in FIG. 3, "the TV setting menu 13"→"the BS setting menu 15". It is assumed that the operation that is normally performed in the order of "the TV setting menu 13"→"the terrestrial setting menu 14" has been statistically determined by the pattern extraction unit 43 or the like from the operation patterns accumulated in the operation pattern DB 43A. It is further assumed that an operation pattern of setting the BS setting menu 15 in an environment where BS broadcast programs are not available also corresponds to an incorrect operation.

In a specific extraction procedure of an incorrect operation pattern, as discussed with respect to the sequential rule extraction unit 44, first, the extraction of a desired state transition pattern is performed on all pieces of operation history information, and then all extracted patterns are filtered using statistical measures (e.g., the frequency, the certainty, and the lift value). This can remove an incorrect operation pattern that has accidentally occurred, and allows only a significant incorrect operation pattern to be left.

FIG. 16 shows an example of an incorrect-operation/correct-operation correspondence table (for the upper layer). In the example shown in FIG. 16, fields of an incorrect-operation/correct-operation correspondence table and fields of a cause-of-incorrect-operation information table, which will be described below, are illustrated so as to partially overlap each other.

The incorrect-operation/correct-operation correspondence table is configured to provide correspondence between incorrect operations and correct operations (originally intended operations), and has the following fields: "state transition pattern", "incorrect operation", and "correct operation".

In the example shown in FIG. 16, the patterns of "main menu→image quality setting menu→main menu→TV setting menu", and "TV setting menu→BS setting menu" are extracted as state transition patterns. With respect to the pattern of "main menu→image quality setting menu→main menu→TV setting menu", "image quality setting menu: IN" is written as an incorrect operation and "TV setting menu: IN" is written as a correct operation. Further, with respect to the pattern of "TV setting menu→BS setting menu", "BS setting menu: IN" is written as an incorrect operation and "terrestrial setting menu: IN" is written as a correct operation.

Then, in steps S54 and S55, the reflection information generation unit 45 reads system information and a reflection method table, which are stored in the memory (not shown). The system information may be used to associate a state transition pattern with an action in an OSD menu hierarchy, and contains an OSD hierarchical structure (see, for example, FIG. 3) and information such as the names of items constituting the hierarchy. The read system information is used for the process of specifying the cause of the incorrect operation (step S56, which will be described below), and the read reflection method table is used for the process of generating reflection information (step S58, which will be described below). After the processing above is completed, the process proceeds to step S56.

FIG. 17 shows an example of a reflection method table (for the upper layer).

The reflection method table shown in FIG. 17 has the following fields: "reflection method type number", "cause of incorrect operation", and "reflection method". The reflection method is configured to define which method (or style) is used to implement an upgrade of the device.

In the present embodiment, with respect to the reflection method type number "0", there is no cause of the incorrect operation and the reflection method is set to "no change". With respect to the reflection method type number "1", the cause of the incorrect operation is misunderstanding of menu items and the reflection method is the creation of a shortcut to the correct menu in the incorrect menu. With respect to the reflection method type number "2", the cause of the incorrect operation is misunderstanding of menu items and the reflection method is the inconspicuous display of the incorrect menu item. With respect to the reflection method type number "3", the cause of the incorrect operation is misunderstanding of menu items and the reflection method is the direct transition from the incorrect menu to the correct menu.

The system information and the reflection method table are preferably defined in advance and prepared before the analysis begins.

Then, in step S56, the cause of incorrect operations is identified for each user on the basis of the incorrect-operation/correct-operation correspondence table and the system information. For example, when the state transition pattern is "main menu→image quality setting menu→main menu→TV setting menu", this pattern corresponds to the pattern of "State A→State C→State A→State B". Thus, the cause is determined to be the misunderstanding between "State C" and "State B", that is, the misunderstanding between the TV setting menu and the image quality setting menu. In the case of the state transition pattern of "TV setting menu→BS setting menu", based on the assumption that the probability that this user will select the TV setting menu followed by the terrestrial setting menu is high, the cause is determined to be the misunderstanding between the BS setting menu and the terrestrial setting menu. After this processing is completed, the process proceeds to step S57.

In step S57, the reflection information generation unit 45 adds the identified cause of the incorrect operation to the corresponding incorrect operation in the incorrect-operation/correct-operation correspondence table shown in FIG. 16 to generate a cause-of-incorrect-operation information table. Then, the generated cause-of-incorrect-operation information table is saved in the memory (not shown). After this processing is completed, the process proceeds to step S58. In the example shown in FIG. 16, the incorrect-operation/correct-operation correspondence table and the cause-of-incorrect-operation information table are configured to partially overlap each other. However, as can be understood, the incorrect-operation/correct-operation correspondence table and the cause-of-incorrect-operation information table may be created as separate tables.

In step S58, reflection information utilized for an upgrade is generated on the basis of the incorrect-operation/correct-operation correspondence table, system information, reflection method table, and cause-of-incorrect-operation information table described above. After this processing is completed, the process proceeds to step S59. Note that the reading of the reflection method table in step S55 may be executed immediately before the processing of step S58.

In step S59, the reflection information generation unit 45 creates a reflection information table on the basis of the generated reflection information, and saves the reflection information table in the memory. After this processing is completed, the reflection information generating process ends.

FIG. 18 shows an example of a reflection information table (for the upper layer).

The reflection information contains information necessary for an upgrade of a remote controller (touch panel). The reflection information table shown in FIG. 18 has the following fields: "target (for reflection)", "reflection method type number", and "detailed reflection method" for reflecting a function in a target for reflection. In the present embodiment, the term "target for (reflection)" refers to an incorrect operation. The number assigned to the "cause of incorrect operation" corresponds to the "reflection method type number" in the reflection method table. The "detailed reflection method" fields contains a specific reflection method for each target.

A method for determining a reflection method type number in the reflection information table will be now described. First, cause-of-incorrect-operation information is extracted from the cause-of-incorrect-operation information table (see FIG. 16), and an entry that matches the extracted information is searched for within the cause-of-incorrect-operation field in the reflection method table (see FIG. 17). Then, the reflection method type number of the matching entry is retrieved. If there is no matching entry, the reflection method type number is set to "0" and is registered. In the example shown in FIG. 17, all the cause-of-incorrect-operation fields are set to the same content. In actuality, however, various causes of incorrect operation are stored. Further, in the example shown in FIG. 17, a plurality of cause-of-incorrect-operation fields contain the same cause of the incorrect operations because a plurality of examples of reflection methods are to be introduced for the same cause of the incorrect operation, for the convenience of description. Thus, only the first hit entry in the search may be selected, or a reflection method table may be initially selected in advance for a single reflection method and may be prepared. Any other method may also be adopted.

In the example shown in FIG. 18, as an example of an upgrade of the OSD menu, the target is the image quality setting menu, the reflection method type number is "1", and the detailed reflection method is the addition of a shortcut to the "TV setting menu". As another example of an upgrade of the OSD menu, the target is the BS setting menu, the reflection method type number is "2", and the detailed reflection method is the inconspicuous display of the BS setting menu.

The reflection information (upgrade information) described in the reflection information table is reflected in a signal processing device of the history reflecting device 50. Alternatively, reflection information may be delivered to the history reflecting device 50 via a network so that the function to be upgraded among interface functions stored in an internal storage unit of the history reflecting device 50 can be updated. A specific example of an upgrade will be described below.
Modification Example of Reflection Information Table.

FIG. 19 shows an example of a reflection information table (for the upper layer) that is obtained by adding time-varying elements (time conditions) to the reflection information table shown in FIG. 18.

As shown in FIG. 19, two records whose target is the image quality setting menu further have time conditions, "a.m." and "p.m.". In the record with the "a.m." condition, the detailed reflection information is the addition of a shortcut to the "TV setting menu". Similarly, in the record with the "p.m." condition, the detailed reflection information is the addition of a shortcut to the "sound quality setting menu". That is, each of these records has been created on the basis of an incorrect operation pattern extracted only from an operation history information obtained in the a.m. or p.m. Further, a record whose target is the BS setting menu also has the time condition "all day long". That is, this record has been created on the basis of an incorrect operation pattern extracted from all operation histories obtained all day long.

It is expected that a user's daily routine, mood, or the like may differ on weekdays and weekends or on holiday, in the morning, afternoon, evening, and night, or the like. Thus, operation patterns are also predicted to differ. Such time conditions are also contained in the reflection information, thereby allowing more accurate and flexible extraction of incorrect operation patterns according to the user's daily routine or the like. A new operation procedure can also be discovered and introduced. For example, in the example shown in FIG. 19, the record with the "a.m." condition indicates that the reflection method is set to the addition of a shortcut to the TV setting menu to the target, namely, the image quality setting menu, so that the TV setting operation is given a high weight. On the other hand, the record with the "p.m." condition indicates that the reflection method is set to the addition of a shortcut to the sound quality setting menu to the target, namely, the image quality setting menu. In this case, it is expected that a user spends time getting comfortable while listening to music or the like.

4. History Analysis Unit (Reflection Information Generation Unit: Lower Layer) According to Embodiment First, the operation of the reflection information generation unit 45 for the lower layer will be described with reference to FIGS. 20 to 25.

Figure 20:
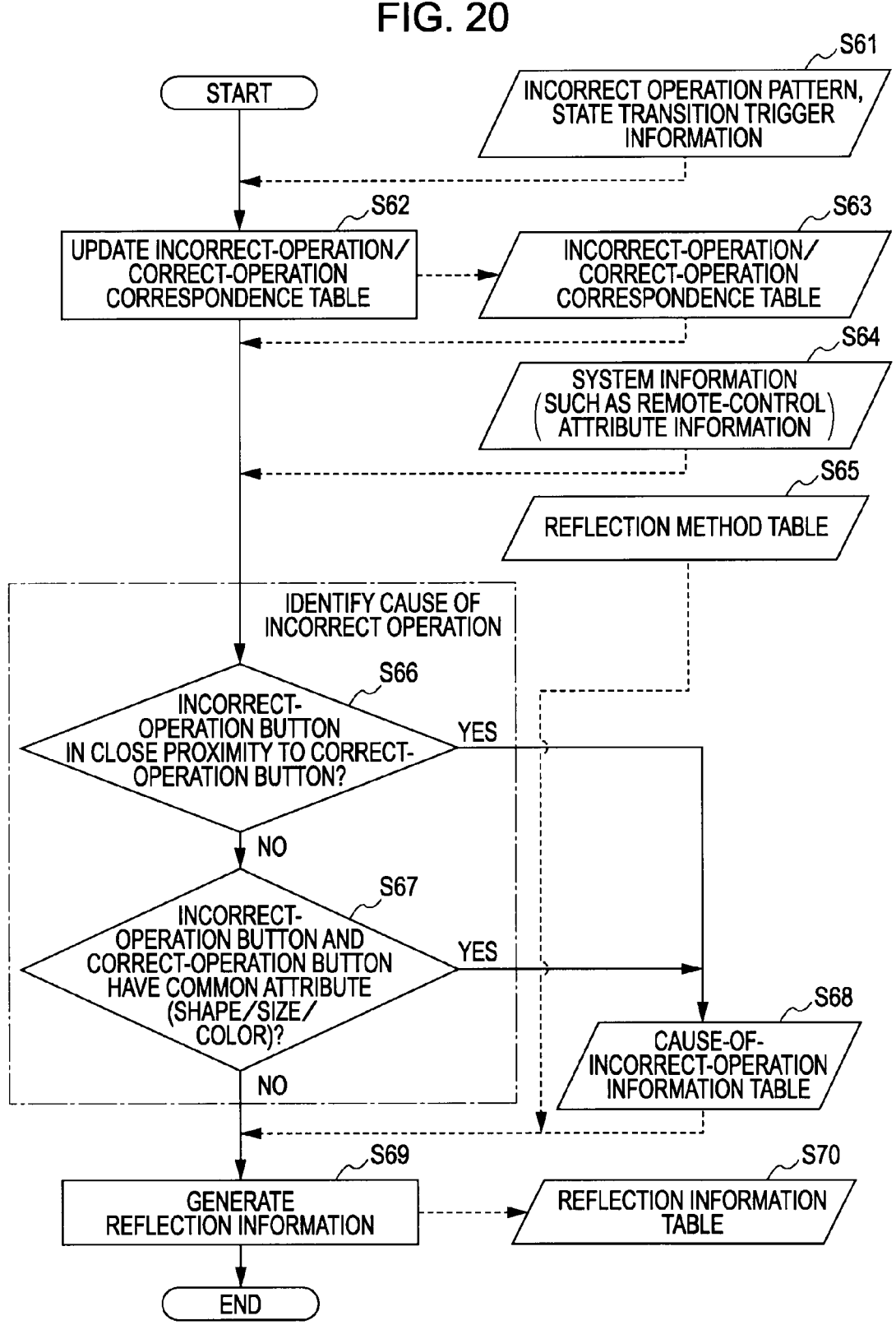
FIG. 20 is a flowchart showing an example of a process (lower layer) performed by the reflection information generation unit according to an embodiment of the present invention.

FIG. 20 is a flowchart showing an example of the process performed for the lower layer of the operation history information by the reflection information generation unit 45 of the history analysis device 40.

When a reflection information generating process is started, first, in step S61, the reflection information generation unit 45 reads an incorrect operation pattern and information regarding state transition triggers. The incorrect operation pattern has been obtained in the previous incorrect operation pattern extracting process (step S44) performed by the sequential rule extraction unit 44. After this processing is completed, the process proceeds to step S62.

In step S62, the reflection information generation unit 45 updates an incorrect-operation/correct-operation correspondence table from the incorrect operation pattern and the information regarding state transition triggers. After this processing is completed, the process proceeds to step S63.

In step S63, the reflection information generation unit 45 saves the updated incorrect-operation/correct-operation correspondence table in a memory (not shown). After this processing is completed, the process proceeds to steps S64 and S65.

For example, in the example shown in FIG. 12, the state transitions in the lower layer, which are obtained from the operation history information, are "initial state"→"initial state"→"main-menu display state"→"main-menu display state"→"main-menu display state"→"image-quality-setting-menu display state"→"main-menu display state"→"main-menu display state"→"TV-setting-menu display state"→"TV-setting-menu display state"→"TV-setting-menu display state"→"BS-setting-menu display state". Thus, the following incorrect operation pattern with one state transition (=erroneous pressing of the button) is extracted from operation history information in the lower layer:

(1) A pattern with a high frequency, a high certainty, and a high lift value, which is generated using out-of-specification remote-control operation, among "State A→State A→State B" patterns This pattern corresponds to the transitions of, in the example shown in FIG. 3, "the initial state 11"→"the initial state 11"→"the main menu 12", where the "return" button and the "menu" button are used as state transition triggers.

In a specific extraction procedure of an incorrect operation pattern, similarly to that for the upper layer, as discussed with respect to the sequential rule extraction unit 44, first, the extraction of a desired state transition pattern is performed on all pieces of operation history information, and then all extracted patterns are filtered using statistical measures (e.g., the frequency, the certainty, and the lift value). This can remove an incorrect operation pattern that has accidentally occurred, and allows only a significant incorrect operation pattern to be left.

In the example described above, the transition states of "main menu"→"main menu"→"image quality setting menu", the transition states of "main menu"→"main menu"→"TV setting menu", and the transition states of "TV setting menu"→"TV setting menu"→"BS setting menu" result in operations within specification, and no incorrect operation pattern is extracted. In this manner, for example, the sequential rule extraction unit 44 refers to the specified patterns accumulated in the memory that stores the operation pattern DB 43A to determine whether the current operation is an incorrect operation or an operation within specification to determine whether or not the extraction is necessary.

FIG. 21 shows an example of an incorrect-operation/correct-operation correspondence table (for the lower layer).

Similarly to that for the upper layer, the incorrect-operation/correct-operation correspondence table has the following fields: "state transition pattern", "incorrect operation", and "correct operation".

In the example shown in FIG. 21, the pattern of "initial state"→"initial state"→"main menu" is extracted as a state transition pattern, and is associated with two incorrect operations.

In the first example shown in FIG. 21, the incorrect operation "return button" and the correct operation "menu button" are written with respect to the pattern of "initial state→initial state→main menu" shown in FIG. 12. In the second example, by way of example, the first operation in the operation history shown in FIG. 12 is based on the "memo button", which is not described, instead of the "return button". Specifically, the incorrect operation "memo button" and the correct operation "menu button" are written with respect to the pattern of "initial state→initial state→main menu". Here, for the convenience of description, it is assumed that no state transition occurs when the "return" button or "memo" button is pressed in the initial state.

Then, in steps S64 and S65, the information generation unit 45 reads system information and a reflection method table, which are stored in the memory (not shown). The system information contains attribute information (see FIG. 25, which will be described below) regarding the remote controller 10. The attribute information may be information including the size, shape, and color of buttons. The read system information is used for the process of specifying the cause of the incorrect operation (steps S66 and S67, which will be described below), and the read reflection method table is used for the process of generating reflection information (step S69, which will be described below). After the processing above is completed, the process proceeds to steps S66 and S67, in which the cause of incorrect operations is identified for each user.

FIG. 22 shows an example of a reflection method table (for the lower layer).

The reflection method table shown in FIG. 22 has, similarly to that for the upper layer, "reflection method type number", "cause of incorrect operation", and "reflection method" fields.

In the present embodiment, with respect to the reflection method type number "0", there is no cause of the incorrect operation and the reflection method is set to "no change". With respect to the reflection method type number "1", the cause of the incorrect operation is "proximity" and the reflection method is the increase in space between buttons. With respect to the reflection method type number "2", the cause of the incorrect operation is "similarity in size" and the reflection method is the change in size of a button. With respect to the reflection method type number "3", the cause of the incorrect operation is "similarity in shape" and the reflection method is the change in shape. With respect to the reflection method type number "4", the cause of the incorrect operation is "similarity in color" and the reflection method is the change in color. Additionally, the symmetrical arrangement of buttons may also be included as a cause of incorrect operation. Depending on the function of the button, horizontally (vertically) symmetrical arrangement of buttons may cause an event such as increasing or decreasing the number of incorrect operations.

Similarly to that for the upper layer, the system information and the reflection method table are preferably defined in advance and prepared before the analysis begins.

Then, in step S66, it is determined whether or not the incorrectly operated button and the button for the correct operation are in close proximity to each other on the touch panel. If the buttons are in close proximity, it is determined that the cause of the incorrect operation is the proximity of buttons, and then the process proceeds to step S68. If the buttons are not in close proximity, the process proceeds to step S67.

In step S67, it is determined whether or not the incorrectly operated button and the button for the correct operation on the touch panel have a common attribute (size/shape/color). If the buttons have a common attribute, it is determined that the cause of the incorrect operation is the similarity of buttons, and then the process proceeds to step S68. If the buttons do not have a common attribute, the process proceeds to step S69. In other words, if "NO" is obtained in the determination of steps S66 and S67, the cause of the incorrect operation is not identified.

The processing of steps S66 and S67 shown in FIG. 20 is an example where the proximity is assigned higher priority than the similarity of buttons (common attribute). By revering this process order, the similarity of buttons can be assigned higher priority to identify the cause of the incorrect operation.

In step S68, the reflection information generation unit 45 adds the identified cause of the incorrect operation to the corresponding incorrect operation in the incorrect-operation/correct-operation correspondence table shown in FIG. 21 to generate a cause-of-incorrect-operation information table. Then, the generated cause-of-incorrect-operation information table is saved in the memory (not shown). After this processing is completed, the process proceeds to step S69. In the example shown in FIG. 21, the incorrect-operation/correct-operation correspondence table and the cause-of-incorrect-operation information table are configured to partially overlap each other. However, as can be understood, the incorrect-operation/correct-operation correspondence table and the cause-of-incorrect-operation information table may be created as separate tables.

In step S69, reflection information utilized for an upgrade is generated on the basis of the incorrect-operation/correct-operation correspondence table, system information, reflection method table, and cause-of-incorrect-operation information table described above. After this processing is completed, the process proceeds to step S70. If the cause of the incorrect operation is not successfully determined ("NO" in the determination of steps S66 and S67), the reflection method type number "0" is selected from the reflection method table, and no reflection information is generated.

In step S70, the reflection information generation unit 45 creates a reflection information table on the basis of the generated reflection information, and saves the reflection information table in the memory. After this processing is completed, the reflection information generating process ends.

FIG. 23 shows an example of a reflection information table (for the lower layer).

The reflection information contains information necessary for an upgrade of a target device. The reflection information table shown in FIG. 23 has the following fields: "target", "reflection method type number", and "detailed reflection method". In the present embodiment, as an example of an upgrade of an OSD menu, by way of example, the targets are the "return button" and the "menu button", the reflection method type number is "1", and the detailed reflection method is the increase in space between the corresponding buttons. As another example, the targets are the "memo button" and the "menu button", the reflection method type number is "3", and the detailed reflection method is the change in shape of the "memo button". As a further example, the targets are the "memo button" and the "menu button", the reflection method type number is "4", and the detailed reflection method is the change in color of the "memo button".

While a plurality of reflection methods are associated with the same target (i.e., the second and third entries), as in the first entry, one target may be associated with one reflection method. It is also to be understood that a plurality of reflection methods may be associated with one target for reflection and all the reflection methods may be applied, or one of the plurality of reflection methods may be applied. In this manner, a plurality of reflection methods are applied to the same target, thereby further improving the effect of preventing an incorrect operation from occurring. Furthermore, for example, a reflection method that has been found to have an improved effect of preventing an incorrect operation from occurring may also be selected for reflection from among a plurality of reflection methods, resulting in high efficiency of preventing an incorrect operation from occurring with respect to the reflection activity.

Modification Example of Reflection Information Table (Lower Layer)

FIG. 24 shows an example of a reflection information table (for the lower layer) that is obtained by adding time-varying elements (time conditions) to the reflection information table shown in FIG. 23.

In the example shown in FIG. 24, a record whose targets are the "return button" and the "menu button" further has a time condition, "a.m.". Further, a record whose targets are the "memo button" and the "menu button" further has a time condition, "p.m.". That is, each of the records is based on an incorrect operation pattern extracted only from an operation history information obtained in the a.m. or p.m.

The adoption of the above time-varying elements is based on the assumption that each user has a different desired attribute. That is, it is not necessary to add a time-varying element for a change in an attribute that is desired by all users. For example, an increase in space between buttons results in a reduction in the occurrence of pressing an incorrect button while an increase in the amount of finger movement can reduce operability. Furthermore, the color of a certain button can be changed so that this button can become more distinguishable while the other buttons may become less distinguishable. In addition, the characteristics of users may also differ depending on the time condition. For example, mainly the user's mother watches TV in the morning and mainly the user's father watches TV at night. In this case, the operators are different. Further, as also discussed with respect to the upper layer, a user performs only the minimum necessary operations in the busy morning hours while performing operations for a longer time at night. In this case, even the same operator has different viewing styles. Therefore, an upgrade based on a time condition, that is, changing the attributes of a remote controller in accordance with a time condition, would be more appropriate according to the actual circumstances than an upgrade under the same conditions all day long.

As has been discussed with respect to the upper layer, user's daily routine, mood, or the like may change depending on have It is assumed that a user has different weekday and weekend or holiday, morning, afternoon, evening, and night, or the like. Alternatively, as described above, the user who uses the history collecting device 30 may be changed. Thus, operation patterns are also predicted to differ. Such time conditions are also contained in the reflection information, thereby allowing more accurate and flexible extraction of incorrect operation patterns according to the user's daily routine or the like. A new operation procedure can also be discovered and introduced.

Once the time condition "all day long" is specified, a record having no time-varying element can also be represented. In this case, a reflection method is set on the basis of an incorrect operation pattern extracted from all operation histories obtained all day long.

FIG. 25 shows an example of a remote-control attribute information table that describes attribute information regarding the remote controller 10, which may be a piece of system information.

In the present embodiment, by way of example, the remote-control attribute information table has "button ID", "allocated SIRCS code", and "position (coordinates)" as fields. The remote-control attribute information table also has "size", "shape", "color", and the like as attributes.

In the remote-control attribute information table, the "button ID" field represents an identification number assigned to a button displayed as an icon on the touch panel.

The "allocated SIRCS code" field represents a SIRCS code allocated to the same button. In the example shown in FIG. 25, for the convenience of illustration, the functions of allocated SIRCS codes are expressed by words.

The "position (coordinates)" field represents the position (coordinates) of the same button on the touch panel.

The "size" attribute is an index of the size at which the same button is displayed on the touch panel.

The "shape" attribute is the shape in which the same button is displayed on the touch panel.

The "color" attribute is the color in which the same button is displayed on the touch panel.

5. History Reflecting Unit According to Embodiment

Next, a history reflecting unit (see FIG. 4) according to an embodiment of the present invention will be described.

The history reflecting unit provides (upgrades) a signal processing device (user interface), which is suitable for each user in view of operation, using the sequential rule extracted by the sequential rule extraction unit 44. This may be implemented by collecting, in a vendor's center, signal processing devices included in the history reflecting devices 50-1 to 50-n placed on the users' side, performing processing such as replacing all the signal processing devices or only substrate devices such as integrated circuits relating to signal processing, and then returning the signal processing devices to the users. In an alternative procedure, a new signal processing device may be delivered to a user and is connected to a signal processing device placed on the user's side so that a new function or the like can be provided.

Alternatively, a memory (storage device) that stores an upgraded program or data for managing the user interface may be exchanged, or upgrade information may be additionally stored in the memory. After processing such as replacing the program or data is performed, the memory may be sent back to a user. Alternatively, a new signal processing device may be sent to the user. The user connects the signal processing device sent from the vendor's center to a remote controller to perform the operation of loading a program, data, or the like that includes upgrade information, into the remote controller from the signal processing device. Accordingly, the remote controller can be upgraded. Alternatively, remote controllers as well as the signal processing devices included in the history reflecting devices 50-1 to 50-n may also be collected, and the upgraded signal processing devices and remote controllers may be returned to the users. A history collecting unit (history collecting device 30) or remote controller having a network interface can transmit upgrade information from the history reflecting unit (history reflecting device 50) via a network.

In the following description, by way of example, the history reflecting device 50 to which upgrade information is provided is implemented by a television receiver.

Figure 26:
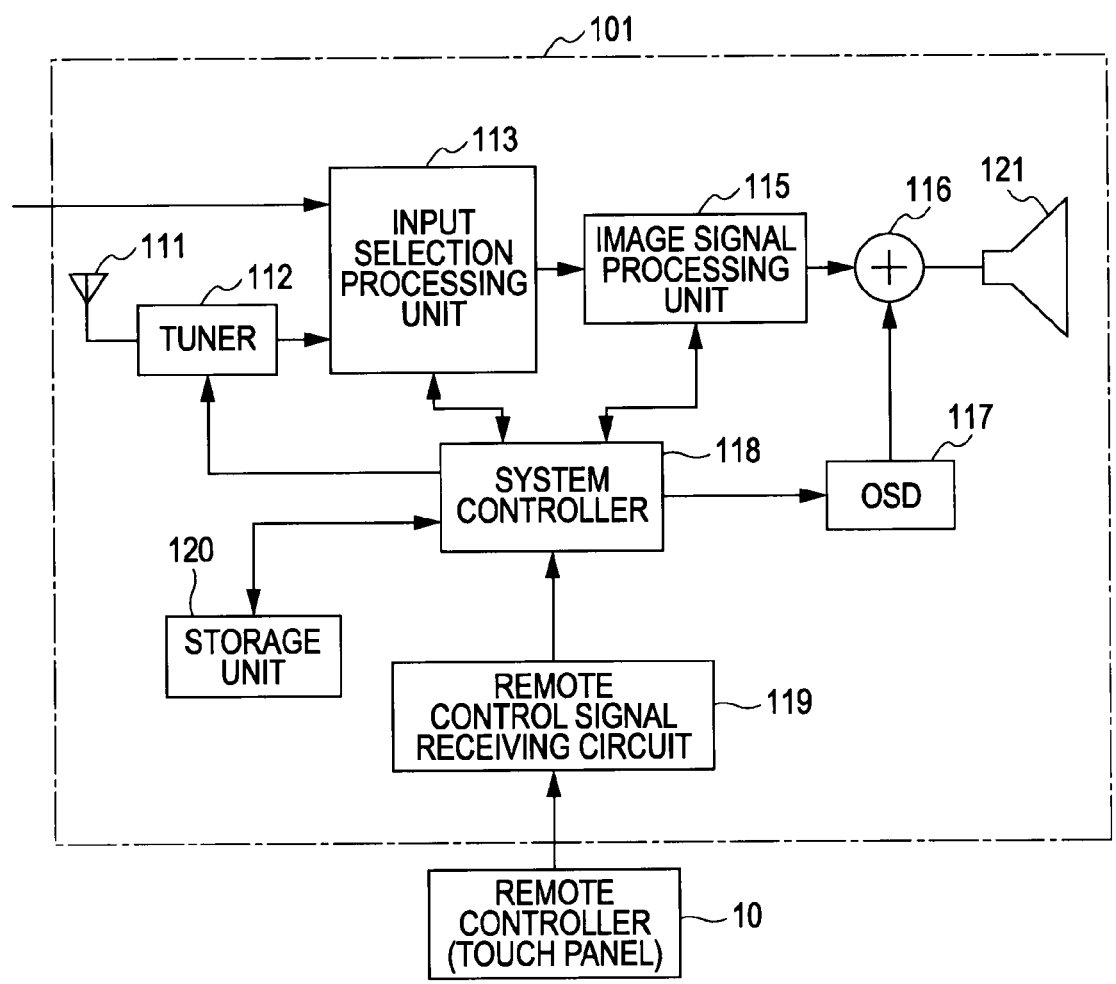
FIG. 26 is a block diagram showing an example internal configuration of a television receiver in which a new function is applied.

FIG. 26 is a block diagram showing an example internal configuration of a television receiver 101 to which upgrade information is provided.

A tuner 112 of the television receiver 101 performs processes, such as channel selection, intermediate frequency amplification, or detection, on a broadcast signal (radio-frequency (RF) modulated signal) captured by a receiving antenna 111 to extract a standard definition (SD) signal, and supplies the SD signal to an input selection processing unit 113.

The input selection processing unit 113 receives, in addition to the SD signal input from the tuner 112, an image signal or a digital video signal input from a digital video disc (DVD), a video tape recorder, or the like (not shown).

The input selection processing unit 113 selects a predetermined signal under control of a system controller 118, and performs pre-processing according to the selected signal. A resulting image signal is supplied to an image signal processing unit 115.

The image signal processing unit 115 has functions such as a function for generating a high definition (HD) signal (1050i signal or 525p signal) from an SD signal (525i signal), a function for adjusting resolution and noise volume, and a zoom function for enlarging a portion of an image to be displayed. The image signal processing unit 115 performs image processing according to a function set by a user and conditions.

An OSD circuit 117 generates a display signal for displaying characters, figures, and the like on a screen of a display unit 121, and supplies the display signal to a combiner 116. The combiner 116 combines the display signal supplied from the OSD circuit 117 with the HD signal supplied from the image signal processing unit 115, and supplies a resulting signal to the display unit 121.

The system controller 118 controls each unit in accordance with a signal supplied from a remote control signal receiving circuit 119 or a signal indicating a user operation input, which is supplied from an operation input unit (not shown) provided as necessary.

For example, the system controller 118 sends a selection signal to the tuner 112 or the input selection processing unit 113, or controls the operation of the OSD circuit 117. The system controller 118 further controls a storage unit 120 to store information indicating a viewed image (hereinafter referred to as selection information), such as information (which can include the broadcast time and title of programs) indicating a channel selected by the tuner 112, and control information (such as content input by a user operating the remote controller 10) supplied from the remote control signal receiving circuit 119.

The storage unit 120 further stores a program for operating the system controller 118 or upgrade information of the program. The content stored in the storage unit 120 can be transferred to a manufacturer via a network, or upgrade information for adding a new function to the remote controller 10, the OSD circuit 117, or the like can be sent from outside by the manufacturer or the like and stored in the storage unit 120.

In the television receiver 101 of the present embodiment, the system controller 118 and the OSD circuit 117 may correspond to the signal processing unit 31 (see FIG. 5) and the user interface 32 in the history collecting device 30, respectively. In order to upgrade a function, the system controller 118 or the OSD circuit 117 may be replaced. Alternatively, if the user interface function of the television receiver 101 is based on the program or data stored in the storage unit 120, upgrade information may be written in the program or data stored in the storage unit 120 by rewriting, additionally writing, or the like.

6. Upgrade (Common, Upper Layer, Lower Layer)
Upgrade: Common

A specific example of an upgrade performed by the history reflecting unit will be described.

When a plurality of sequential rules are to be reflected, in some cases, sequential rules may conflict each other. In such cases, the sequential rules may be assigned priorities, and may be reflected in descending order starting from the highest-priority sequential rule. Criteria for priorities may include the frequency of occurrence, certainty, and lift value of the sequential rules. If sequential rules that conflict with each other have different conditions, the sequential rules may also be reflected for each condition (such as referring to a reflection information table for each condition such as time to allocate a plurality of types of commands to remote-control buttons). Further, a standard such as not changing all (or as much as possible) the allocations to the remote-control buttons related to an incorrect operation pattern that is regarded as having being overcome by a user because of his/her familiarity with the remote controller 10 can also be set.

In the following, a specific example of the upgrade performed by the history reflecting unit will be described separately in the context of the upper and lower layers.
Specific Example for Upper Layer An upgrade of an OSD menu using an extracted sequential rule will be described. In this specific example, an OSD menu in which items are hierarchically selected in a menu mode or the like is employed.
Upgrade of OSD Menu: Hierarchical Adjustment It is assumed that a reproducible (high-frequency and high-certainty) pattern with transitions to a higher hierarchical level where a certain item C is selected, then to a lower hierarchical level, immediately thereafter back to the higher hierarchical level from the lower hierarchical level, where another item B is selected, and then to the lower hierarchical level (State A→State C→State A→State B) has been obtained. In this case, a reflection method such as changing the separation between the items C and B may be adopted. For example, when there is a sequential rule in which at the higher hierarchical level (State A), first, the item C is selected (State C), then, returning to the original state (State A) from the state C, the item B is selected, with the transition to State B to set the item B, (a shortcut to) the setting of the item B may also be placed on the lower hierarchical level with respect to the item C.

This allows for a transition to a hierarchy where the item to be originally displayed exists even when an unintended hierarchy has been displayed due to an incorrect operation.

Figure 27:
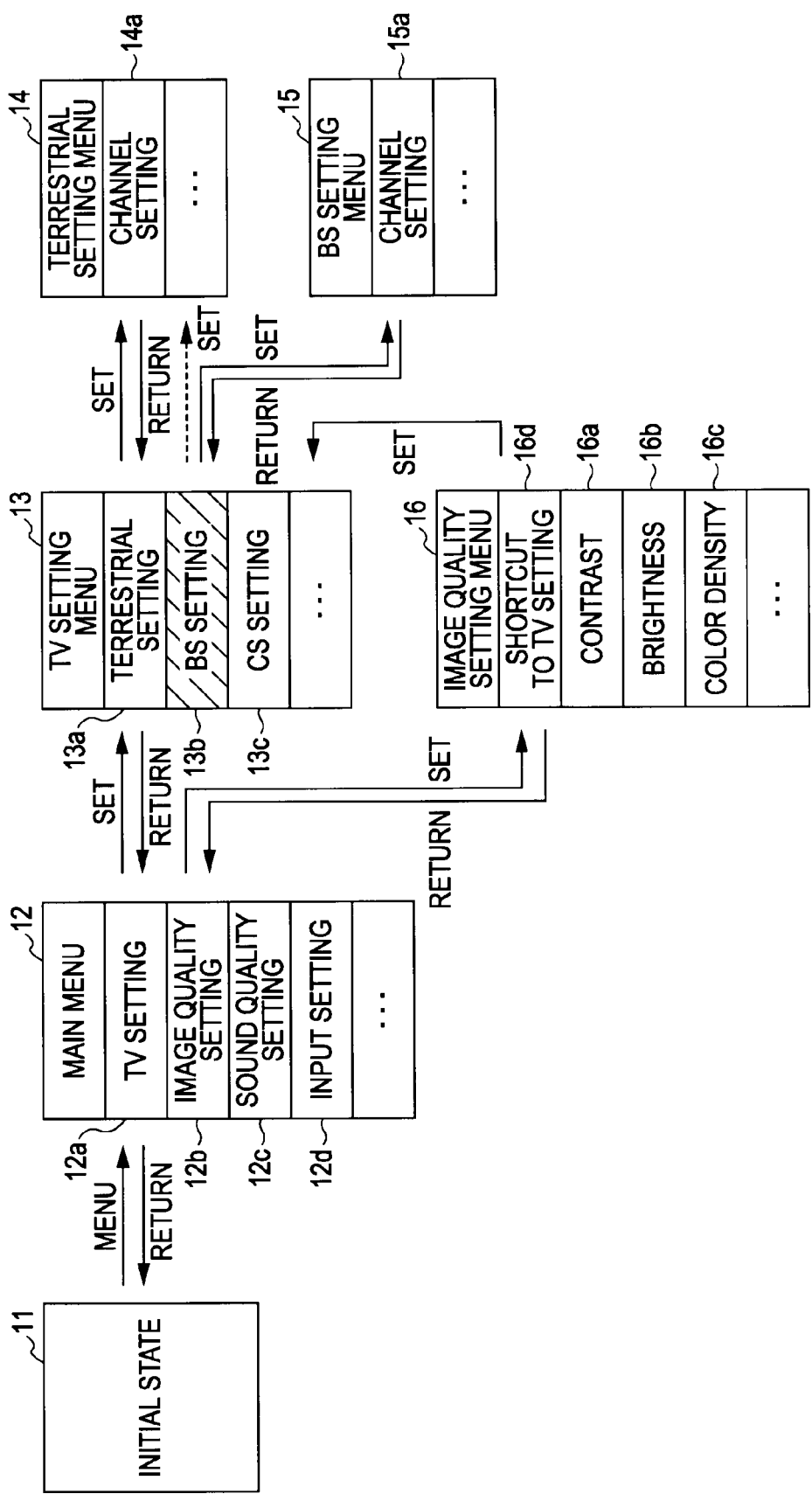
FIG. 27 is a diagram showing an example upgrade of an OSD menu (upper layer) according to an embodiment of the present invention.

Here, if the sequential rule may contain a "time" condition, the menu hierarchical structure can be established so as to be changed in accordance with time (time-varied). Specifically, in a certain time zone, menu hierarchies can be assigned in the manner described above on the basis of a sequential rule X while in another time zone, menu hierarchies can be assigned in the manner described above on the basis of a sequential rule Y. Such a flexible menu hierarchical structure can therefore be provided.
Upgrade of OSD Menu: Display Adjustment FIG. 27 shows an example upgrade of an OSD menu (upper layer). The display adjustment of the OSD menu, which is an example upgrade, will be described with reference to FIG. 27. Referring to FIG. 27, a BS setting option 13b of a TV setting menu 13 is displayed in an inconspicuous manner (which is represented by hatching). This is a result of reflection of the reflection information of the reflection method type number "2" in the reflection information table (see FIG. 18).

The inconspicuous display of the BS setting option 13b can reduce the probability of the occurrence of an incorrect operation in which the BS setting option 13b is erroneously selected instead of a terrestrial setting option 13a. Examples of inconspicuous display include the display of characters in a light or pale color, and the gray-display of icons in which icons are displayed in gray.

Further, the positional relationship in the menu can be adjusted by, for example, increasing the distance between the incorrect operation item (the BS setting option 13b) and the correct operation item (the terrestrial setting option 13a). Accordingly, the probability of the occurrence of an incorrect operation can be further reduced.

Next, an example of an upgrade of the OSD menu (hierarchically displayed) shown in FIG. 3 will be described with reference to FIG. 27.

In this OSD menu, the image quality setting menu 16 includes a "shortcut to TV setting" option 16d. This is a result of reflection of the reflection information in the reflection method type number "1" in the reflection information table (see FIG. 18). With this upgrade, even if the image quality option 12b has been erroneously selected instead of the TV setting option 12a, the TV setting menu 13 can be displayed by selecting the "shortcut to TV setting" option 16d from the image quality setting menu 16.

As shown in FIG. 27, displaying a shortcut item in an upper portion in a setting menu can improve the readability of this item in the transition to another setting menu in the same hierarchy. Operability can also be improved.
Upgrade of Signal Processing Unit and the like Next, an upgrade of the user interface 32 or signal processing unit 31 shown in FIG. 5 or the system controller 118 or OSD circuit 117 shown in FIG. 26 will be described.

Here, a structure configured to prevent the occurrence of an incorrect operation of each user that is likely to occur is reassembled using the findings of incorrect operations (such as an incorrect operation pattern), which have been obtained from operation history information. To this end, the history collecting device 30 shown in FIG. 5 includes a lookup table (not shown) having combinations of incorrect operations (occurrence conditions (such as time) and the content of the incorrect operations) and target operations, and incorporates a structure for when a corresponding incorrect operation pattern occurs, determining that a target operation has been performed and switching operation codes. A similar concept applies to the system controller 118 and OSD circuit 117 shown in FIG. 26.

In a generalized version of the history analysis device 40, a reflection method may be adopted in which with respect to a sequential rule "A→B→C" relating to an incorrect operation, which has been obtained under a narrow-down condition A, when an operation A was followed by an operation B, this operation is negated and an operation C is regarded as having been performed.

For example, it is assumed that a user has a habit of watching the same program in the same time zone every week. When the user scans through different channels (so-called zapping, or channel surfing) and switches the channels in the order of "Channel 1→Channel 2 (A→B)" (presses the Channel-2 button), a lookup table (combinations of occurrence conditions, the content of incorrect operations, and target operations) that includes the switching of channels in the order of "Channel 1→Channel 3 (A→C)" or the like may be provided in the user interface 32 (which is designed to switch transmission SIRCS codes of the remote controller 10 shown in FIG. 2) or the signal processing unit 31 (which is designed not to perform program changes according to a received SIRCS code) to sequentially switch between internal processes.

Further, for example, each unit may be provided with a lookup table (combinations of occurrence conditions, the content of incorrect operations, and target operations) that includes a pattern of erroneously pressing a "decrease sound volume" button B in a certain OSD menu hierarchy A and then, again in the menu hierarchy A, pressing a correct, cursor down button C. Then, when the "decrease sound volume" button B is pressed, the user interface 32 (which is designed to switch transmission SIRCS codes of the remote controller 10) or the signal processing unit 31 (which is designed not to perform program changes according to a received SIRCS code) shown in FIG. 5 interprets that the cursor down button C has been pressed, and moves down the cursor. Such a reflection method may be adopted.

Specific Example for Lower Layer

Upgrade of Remote Controller

An upgrade of a remote controller using a sequential rule will be described.

In a case where it is possible to change a physical attribute of buttons on the remote controller, the following examples of upgrade may be available:

The cause of the incorrect operation is the proximity of buttons. →The distance between buttons is increased.

The cause of the incorrect operation is the similarity in size of buttons. →The size of a button is changed so that the buttons have different sizes.

The cause of the incorrect operation is the similarity in shape of buttons. →The shape of a button is changed so that the buttons have different shapes.

The cause of the incorrect operation is the similarity in color of buttons. →The color of a button is changed so that the buttons have different colors.

In the above examples, an incorrect operation pattern is associated with a physical attribute of the remote controller.

For example, if an upgrade can be made by changing the spatial position or size of remote-control buttons (such as a touch-panel remote controller), not only the allocations of SIRCS codes to the remote-control buttons but also the positions of the buttons can be changed to prevent an incorrect operation from occurring. For example, the spatial distance between buttons A and B can be increased to suppress the occurrence of an incorrect operation.

While only the relationship between the buttons A and B has been discussed, buttons A' and B' having the same spatial arrangement and having the same transition models may also be changed in the same or similar manner because it is determined that a similar incorrect operation can occur. For example, in the remote controller 10 shown in FIG. 2, in a case where the menu button 10a and the return button 10b are arranged so that the space (distance) therebetween becomes large, the space between the return button 10b and the memo button 10c and between the memo button 10c and the power button 10d may also be increased. Therefore, based on reflection information regarding a certain target, reflection information regarding another target having the same attributes (i.e., a target for which an incorrect operation can occur due to the same cause) can also be generated.

Figure 28:
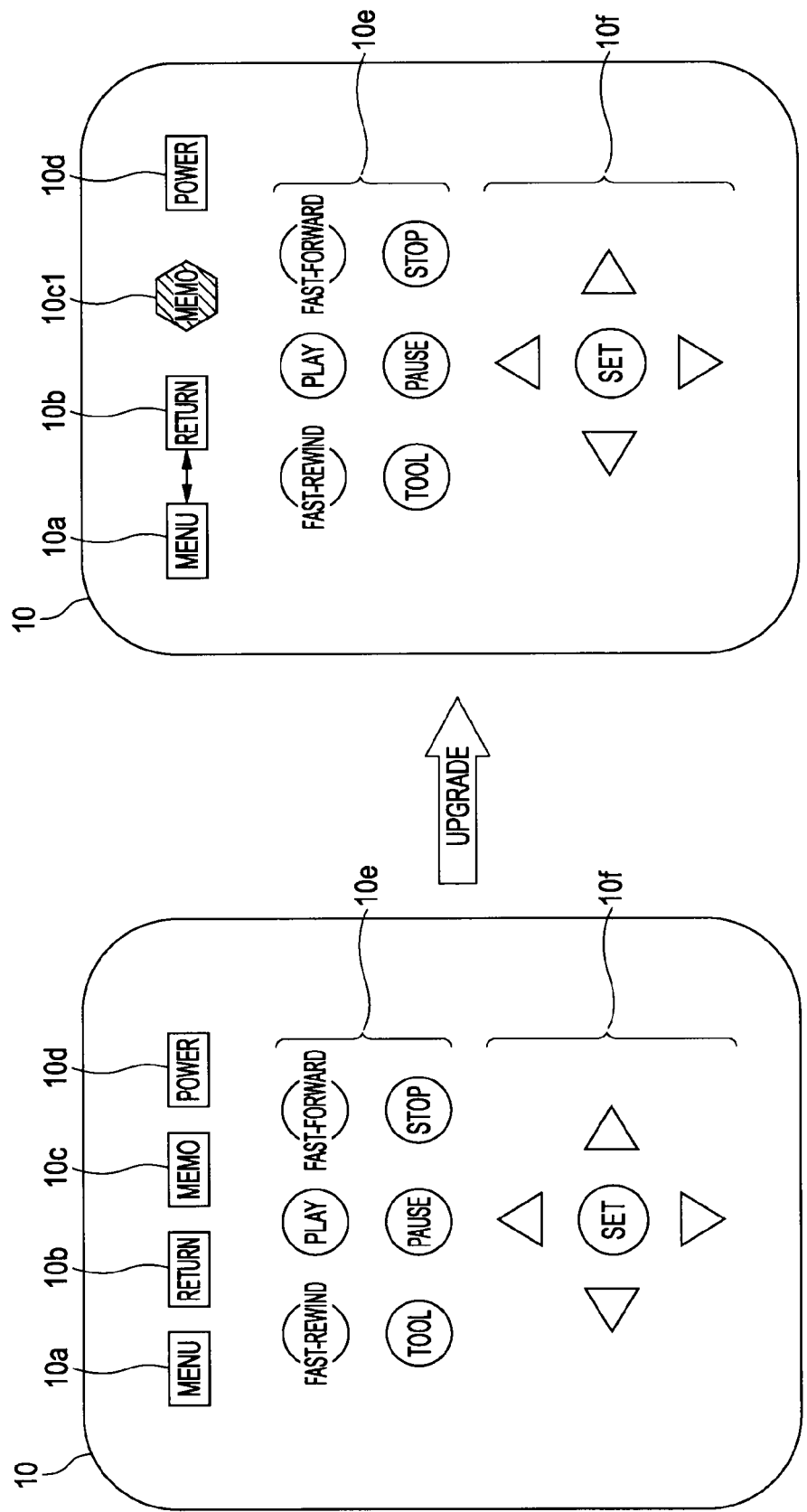
FIG. 28 is a diagram showing a remote controller (touch panel) (lower layer) according to an embodiment of the present invention.

FIG. 28 is a diagram showing an example upgrade of a remote controller (touch panel) (for the lower layer). In an example of the present embodiment, a description will be given of an upgrade of the remote controller 10 by modifying the arrangement, attributes, and the like of buttons displayed on a touch panel of the remote controller 10 on the basis of the reflection information table shown in FIG. 23.

In the reflection information table shown in FIG. 23, in a case where the targets are the "return button" and the "menu button", the detailed reflection method is the increase in space. Thus, as shown in FIG. 28, the menu button 10a and the return button 10b are arranged so that the space (distance) therebetween becomes large. Further, in a case where the targets are the "memo button" and the "menu button", two detailed reflection methods are available: the change in shape of the "memo button" and the change in color of the "memo button". Thus, as shown in FIG. 28, the shape and color of the memo button 10c are changed to obtain a memo button 10c1.

In this manner, the arrangement of confusing buttons is changed, thereby avoiding the situation where an incorrect operation is likely to occur and preventing or minimizing the risk of causing an incorrect operation. Further, the attributes (such as the shape/size/color) of confusing buttons are changed, thereby presenting the difference between these buttons (e.g., the "memo" button and other buttons) to the user to alert the user of a potential risk of an incorrect operation. This can prevent or minimize the risk of causing an incorrect operation.

On the other hand, in a case where it is not possible to change a physical attribute of buttons, the following examples of upgrade may be used to indirectly deal with the incorrect operation:

The cause of the incorrect operation is the proximity of buttons. →Buttons located far from each other are reassigned functions.

The cause of the incorrect operation is the similarity in size of buttons. →The functions are reassigned to buttons having different (as much as possible) sizes.

The cause of the incorrect operation is the similarity in shape of buttons. →The functions are reassigned to buttons having different (as much as possible) shapes.

The cause of the incorrect operation is the similarity in color of buttons. →The functions are reassigned to buttons having different (as much as possible) colors.

For example, if an upgrade is made without changing the spatial position of remote-control buttons arranged on a remote controller, the SIRCS codes assigned to the remote-control buttons are changed. For example, an incorrect operation pattern of "X→X→Y" (when a button A is pressed during "X→X" and a button B is pressed during "X→Y") is extracted as a pattern obtained by erroneously pressing, instead of the button B, the button A located near the button B. In this case, the function (SIRCS code) of the button A is reassigned to another button located far from the button B. Then, a button C assigned a new SIRCS code is arranged at the position where the button A is originally located. In this case, in order to prevent a problem that may be involved in changing the assignment, the button C is preferably a button that would not have an effect on the execution of the button B. For example, it is desirable to provide a direct transition to the transition target state of the button B even from the transition target state of the button C.

For example, it is assumed that the button B is an image quality adjustment button and that the button C is a power button. In this case, if the button C is pressed by mistake, unless the button C is pressed once again to turn the power on, the image quality adjustment mode is not set even when the button B is pressed. In this case, therefore, changing the assignment of the buttons would conversely increase seriousness and cause inconvenience. On the other hand, if it is assumed that the button C is a menu button, even the erroneous pressing of the button C would not have an effect on the execution of the button B (given that a direct transition from the menu mode to the image quality adjustment mode is possible).

7. Group-by-Group Upgrade

The upgrade described above can also be made for each user. Preferably, the upgrade is made for each group of users having the same features in view of the production cost. In the embodiment of the present invention, the vendor's center can collect operation history information regarding each user and can perform comparison between users. Thus, a plurality of users having similar features can be grouped.

For example, a sequential rule regarding a incorrect operation of each user is extracted, and only sequential rules obtained from more than a certain number of users may be to be upgraded. Further, which sequential rule is to be upgraded for each user may be determined using, for example, the following methods:

(1) All sequential rules to be upgraded (2) A sequential rule associated with each user among the sequential rules to be upgraded In an embodiment of the present invention, basically, an incorrect operation pattern caused by each user is resolved. However, even an incorrect operation pattern that is not caused by each user, such as an incorrect operation pattern caused by another user having similar characteristics or an operation pattern that can be predicted to cause an incorrect operation, may also be included in targets to be upgraded.

Further, users to be examined at a time can be determined using the following methods:

(1) All users from which operation histories have been collected (2) Users associated with more than a certain number of sequential rules determined (for example, several standard sequential rule sequences are prepared in view of implementation cost criteria or feasibility, and only more than a certain number of users that meet individual elements of each sequential rule sequence are extracted)

Further, following are examples of the unit of upgrade:

(1) A group associated with frequent occurrence of an incorrect operation caused by the proximity arrangement of remote-control buttons (2) A group associated with frequent occurrence of an incorrect operations caused by the similarity in shape of remote-control buttons (3) A group associated with frequent occurrence of an incorrect operations caused by the symmetrical arrangement of remote-control buttons Specific Example of Group-by-Group Upgrade A specific example of the group-by-group upgrade described above will now be described.

FIG. 29 is a diagram for illustrating a group-by-group upgrade. A table shown in FIG. 29 has records U1 to U5 with respect to fields representing sequential rules R1 to R5. The rule R1 indicates that the space between the "return button" and the "menu button" is increased, and the rule R2 indicates that the space between the "return button" and the "memo button" is increased. The rule R3 indicates that the color of the "memo button" is changed. The rule R4 indicates that the shape of the "return button" is changed, and the rule R5 indicates that the color of the "power button" is changed. In this table, value "1" is set when a user operation corresponds to a sequential rule, and value "0" is set otherwise.

Figure 30:
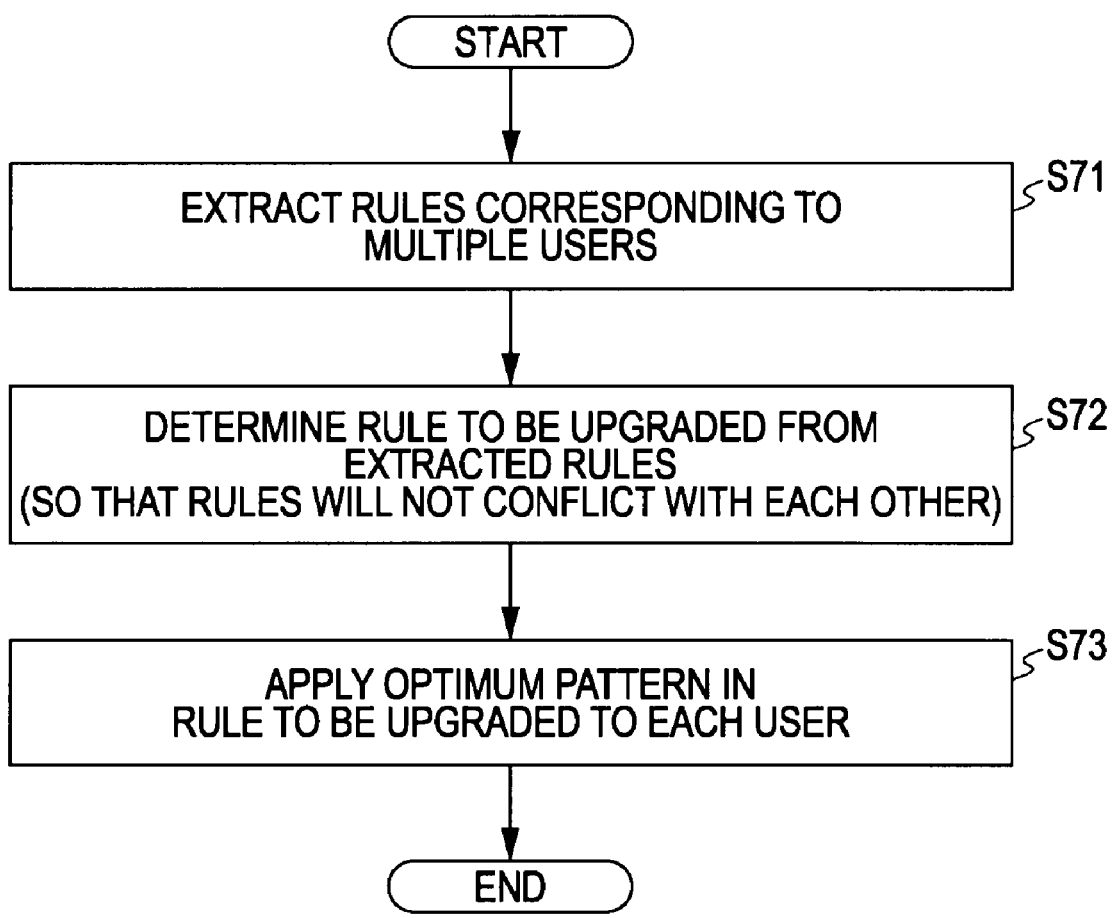
FIG. 30 is a flowchart showing an example of a group-by-group upgrade process according to an embodiment of the present invention.

FIG. 30 is a flowchart showing an example of the group-by-group upgrade process. An example of the group-by-group upgrade process will be described with reference to FIGS. 29 and 30.

First, in step S71, rules corresponding to multiple users are extracted. For example, "sequential rules corresponding to more than 50% users (i.e., more than 2.5 users)" may be extracted. In this case, the rules R1, R2, and R3 are to be extracted. After this processing is completed, the process proceeds to step S72.

In step S72, a rule to be upgraded is determined from among the extracted sequential rules. In this case, a rule to be upgraded is determined so that rules will not conflict with each other. After this processing is completed, the process proceeds to step S73.

For example, if the rules R1 and R2 conflict with each other (that is, both rules are not applicable at the same time), possible combinations of rules to be upgraded can be expressed as:

A1=(1, 0, 0, 0, 0)→Represents that only the rule R1 is applied.

A2=(0, 1, 0, 0, 0)→Represents that only the rule R2 is applied.

A3=(0, 0, 1, 0, 0)→Represents that only the rule R3 is applied.

A4=(1, 0, 1, 0, 0)→Represents that the rules R1 and R3 are applied.

A5=(0, 1, 1, 0, 0)→Represents that the rules R2 and R3 are applied.

In step S73, an optimum pattern in the rule to be upgraded is applied to each user (target device) to perform an upgrade. After this processing is completed, the group-by-group upgrade process ends.

In an example of the present embodiment, in order to apply an optimum pattern in a rule to be upgraded, a rule Ax to be upgraded (in this example, x=1 to 5) that meets the following condition is derived for every rule B corresponding to each user:

"Rule Ax that meets $|Ax\&(\neg B)|=0$ and for which the value of $|Ax\&(B)|$ is maximum"

The above condition indicates that under the constraint of upgrading only a rule corresponding to each user, as many rules as possible are upgraded. In the above equation, $|Ax|$ denotes the number of rules corresponding to Ax (which corresponds to the number 1), and $\neg B$ denotes the negation of B.

For example, when B=(0, 1, 1, 0, 0) holds for the user U1, the above condition is calculated as follows:

$$|A1\&(\neg B)|=|(1,0,0,0,0)|=1$$

$$|A2\&(\neg B)|=|(0,0,0,0,0)|=0$$

$$|A3\&(\neg B)|=|(0,0,0,0,0)|=0$$

$$|A4\&(\neg B)|=|(1,0,0,0,0)|=1$$

$$|A5\&(\neg B)|=|(0,0,0,0,0)|=0$$

$$|A2\&\ B|=|(0,1,0,0,0)|=1$$

$$|A3\&\ B|=|(0,0,1,0,0)|=1$$

$$|A5\&\ B|=|(0,1,1,0,0)|=2$$

Based on the above results, the sequential rule A5 is applied to the user U1. That is, the upgrade of the rules R2 and R3 is performed on the target device. Therefore, a user can upgrade as many sequential rules as possible under the constraint of upgrading only a sequential rule corresponding to this user.

For example, the history analysis device 40 may store a table for a group-by-group upgrade as shown in FIG. 29, together with the reflection information table (see FIGS. 18 and 23), in the reflection information storage device 40M or the like. Based on this table, a rule to be upgraded is delivered to the history reflecting device 50 that is owned by the corresponding user via a network to upgrade a program or data for managing the user interface, which is stored in the storage unit 120. Alternatively, a signal processing device such as the system controller 118 or the OSD circuit 117 may be replaced with that in which upgrade information has been reflected.

According to the embodiment described above, an upgrade system configured to discover a sequential rule of an incorrect operation from records such as users' operation histories and device states and to provide a signal processing device (device to be operated) suitable for each user or each group (of users having similar features) in view of operation can be established.

Further, an upgrade, which would not be performed by a method in which potential occurrence of incorrect operations that will be caused by users is predicted during development and in which a specialized operation-assistance mechanism is installed in advance, can be achieved.

Furthermore, group-by-group reflection, rather than user-by-user reflection, would reduce the development cost.

Moreover, unlike methods based on questionnaires or the like, it is possible to also obtain information from user's unconscious operations. Thus, potential incorrect operations can be collected, resulting in the development of easy-to-use user interfaces (such as OSD menus and touch panels).

The upgrade type (history information collection type) according to an embodiment of the present invention has the following advantages over the existing self-tuning type (learning type):

(1) The capability of comparison with other users' data.

(2) The capability of processing information regarding operation patterns that are not generally processed in the self-tuning type, such as incorrect operations that are difficult to predict, and operation patterns that are not defined in advance as patterns of incorrect operations due to the constraints on cost or processes (in hardware and/or software).

(3) The capability of reducing load on a signal processing device to be provided to a user.

(4) The capability of simple processes (in hardware and/or software). The self-tuning type provides specialization for the general public as a target, and may cause redundant processes. The upgrade type of the embodiment of the present invention, in contrast, provides specialization for a group (of individuals) as a target, and allows simplified processes.

8. Others

An embodiment of the present invention may provide, in addition to the television receiver described above, an electronic device to which a user operation can be applied or whose internal state is characteristically changeable, namely, an electronic device from which different pieces of operation history information can be collected depending on the use environment, such as a game console, a personal computer, a mobile phone, an electronic dictionary, or a music player.

Further, in the present embodiment, as described above, a touch panel (operation device) is mounted on the remote controller 10 configured to send a control signal to a device to be controlled (the history collecting unit or the history reflecting unit), by way of example. However, the main body of a device to be operated may be provided with a touch panel. Further, even a remote controller having no touch panel is capable of changing an OSD menu or the like on the basis of state transitions in the upper or lower layer of the operation history information. As already described, if the allocations of SIRCS codes to a remote controller are changeable, the remote controller can be upgraded in a limited fashion even if the remote controller has no touch panel.

Furthermore, the series of processes performed by the history analysis device 40 described above can be executed by hardware or software. It is to be understood that a function for executing those processes can also be implemented using a combination of hardware and software. If the series of processes is executed by software, a program constituting the software is installed from a program recording medium into a computer incorporated in dedicated hardware or a device capable of executing various functions by installing therein various programs, such as a general-purpose computer.

FIG. 31 is a block diagram showing an example configuration of a computer 201 that executes the series of processes described above according to a program. The computer 201 may be, for example, a dedicated computer with improved performance for the execution of the series of processes, or any other computer having certain capabilities, such as a personal computer.

A central processing unit (CPU) 211 of the computer 201 executes the series processes described above and various processes according to a program recorded on a read only memory (ROM) 212 or a recording unit 218. A random access memory (RAM) 213 stores the program executed by the CPU 211 or data, as necessary. The CPU 211, the ROM 212, and the RAM 213 are connected to one another via a bus 214.

The CPU 211 is also connected to an input/output interface 215 via the bus 214. The input/output interface 215 is connected to an input unit 216 including a keyboard, a mouse, and a microphone, and an output unit 217 including a display and speakers. The CPU 211 executes various processes in response to instructions input from the input unit 216. Then, the CPU 211 outputs a processing result to the output unit 217.

The recording unit 218 which is connected to the input/output interface 215 may be, for example, a hard disk, and records the program executed by the CPU 211 and various data.

A communication unit 219 communicates with an external device via a network such as the Internet or a local area network. A program may be obtained through the communication unit 219 and may be recorded on the recording unit 218.

When a removable medium 231 such as a magnetic disk, an optical disk, a magneto-optical disk, or a semiconductor memory is placed, a drive 220 connected to the input/output interface 215 drives the removable medium 231 and obtains a program, data, or the like recorded thereon. The obtained program or data is transferred to and recorded on the recording unit 218, as necessary.

A program recording medium storing a program that is installed into a computer and that is executable by the computer is provided as a packaging medium using the removable medium 231 as shown in FIG. 31. The removable medium 231 may be a magnetic disk (including a flexible disk), an optical disk (including a compact disc-read only memory (CD-ROM), a digital versatile disc (DVD), and a magneto-optical disk), a semiconductor memory, or the like. Alternatively, the program recording medium may be constructed by the ROM 212 in which a program is temporarily or permanently stored (recorded), a hard disk that may serve as the recording unit 218, or the like.

A program may be stored in the program recording medium through the communication unit 219 which may serve as an interface such as a router or a modem, as necessary, via a wired or wireless communication medium such as a local area network (LAN), the Internet, or digital satellite broadcasting.

In this specification, processing steps describing a program stored in the recording medium may include, as well as processes executed in time sequence in accordance with the order described herein, processes executed in parallel or individually (for example, parallel processes or object-based processes), which may not necessarily be executed in time sequence.

Further, the program may be processed by a single computer, or may be processed in a distributed manner by a plurality of computers. The program may also be transferred to a distant computer and may be executed.

Since the foregoing embodiments are specific examples in preferred form for implementing the present invention, technically preferred various limitations are given. However, the scope of the present invention is not limited to these embodiments unless specifically stated in the foregoing description of the embodiments. Therefore, for example, the processing time, processing order, and numerical condition for each parameter illustrated in the foregoing description are merely preferred examples, and the size, shape, arrangement, and the like of components in the figures merely serve to provide schematic exemplary illustration of the embodiments. Thus, the present invention is not limited to the examples of the embodiments described above, and a variety of modifications or changes can be made without departing from the scope of the present invention.

The present application contains subject matter related to that disclosed in Japanese Priority Patent Application JP 2008-196613 filed in the Japan Patent Office on Jul. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a pattern extraction unit including a processor configured to extract an operation pattern of each of plural users from operation history information obtained from a plurality of devices to be operated, the operation history information at least including information regarding operation histories of the users and device states;
a rule extraction unit configured to extract an incorrect operation pattern from the operation patterns of the plural users extracted by the pattern extraction unit, the incorrect operation pattern being an operation pattern caused by incorrect operations performed by the users; and
a reflection information generation unit configured to identify a cause of the incorrect operations from a type of the incorrect operation pattern and generate, based on the cause of the incorrect operations, reflection information configured to be reflected in functions of the devices to be operated,
wherein the rule extraction unit identifies a first group of one or more of the plural users that performed the incorrect operation pattern, and a second group of one or more of the plural users that performed a different incorrect operation pattern, and the reflection information generation unit generates the reflection information to be reflected in the functions of the devices to be operated by the identified first and second groups.

2. The information processing apparatus according to claim 1, wherein the pattern extraction unit extracts, as an operation pattern, state transitions at a lower hierarchical level and state transitions at a higher hierarchical level, the state transitions at the lower hierarchical level being obtained when each of the users operates operation means for sending a control signal to a corresponding one of the devices to be operated, the state transitions at the higher hierarchical level being generated by collecting, for each same class, the state transitions obtained when the operation means is operated.

3. The information processing apparatus according to claim 2, wherein the reflection information generation unit generates reflection information based on the state transitions at the lower hierarchical level or the state transitions at the higher hierarchical level, the reflection information at least including an incorrectly operated object in which the reflection information is to be reflected, and information regarding a reflection method for allowing the incorrectly operated object to reflect the reflection information.

4. The information processing apparatus according to claim 3, wherein the reflection information generation unit specifies, based on the incorrect operation pattern extracted by the rule extraction unit, a user associated with a similar incorrect operation pattern, and
the reflection information generation unit reflects reflection information in one of the devices to be operated that is owned by the specified user, the reflection information being based on an incorrect operation pattern that is associated with more than a certain number of users and that is associated with the specified user.

5. The information processing apparatus according to claim 4, wherein when an operation pattern extracted by the pattern extraction unit includes transitions of a state at the lower hierarchical level or a state at the higher hierarchical level to a first state, a second state, the first state, and a third state, the rule extraction unit determines that the operation pattern is an incorrect operation pattern.

6. The information processing apparatus according to claim 4, wherein when an operation pattern extracted by the pattern extraction unit includes transitions of a state at the lower hierarchical level or a state at the higher hierarchical level to a first state, the first state, and a second state, the rule extraction unit determines that the operation pattern is an incorrect operation pattern.

7. The information processing apparatus according to claim 4, further comprising an operation pattern database configured to store the operation patterns extracted by the pattern extraction unit,
wherein the rule extraction unit extracts an operation pattern corresponding to an operation pattern extracted by the pattern extraction unit from the operation patterns stored in the operation pattern database, and
wherein when a statistic of the operation pattern meets a predetermined condition, the rule extraction unit determines that the operation pattern is an incorrect operation pattern.

8. The information processing apparatus according to any of claims 5 to 7, wherein the information regarding the reflection method in the reflection information includes a change in state transitions in an on-screen display menu hierarchy corresponding to the higher hierarchical level.

9. The information processing apparatus according to any of claims 5 to 7, wherein the operation means is a touch panel having buttons each being assigned a predetermined function, and
wherein the reflection information includes a change in the buttons of the touch panel.

10. The information processing apparatus according to claim 9, wherein based on reflection information for one of the buttons of the operation means, reflection information for another button having a same attribute as the one of the buttons is generated.

11. The information processing apparatus according to any of claims 5 to 7, wherein the information regarding the reflection method in the reflection information includes a change in assignment of operation codes.

12. An information processing system comprising:

a plurality of devices to be operated, each including an input unit configured to generate a control signal based on an operation input of a user, a signal processing unit configured to process the control signal input from the input unit, and a history storage unit configured to store, as operation history information, an operation history of the user and a state of the device obtained after the control signal is processed; and an information processing apparatus including a pattern extraction unit configured to extract an operation pattern of each of plural users from operation history information obtained from the plurality of devices to be operated, the operation history information at least including information regarding operation histories of the users and device states, a rule extraction unit configured to extract an incorrect operation pattern from the operation patterns of the plural users extracted by the pattern extraction unit, the incorrect operation pattern being an operation pattern caused by incorrect operations performed by the users, and a reflection information generation unit configured to identify a cause of the incorrect operations from a type of the incorrect operation and generate, based on the cause of the incorrect operations, reflection information configured to be reflected in functions of the devices to be operated, wherein the rule extraction unit identifies a first group of one or more of the plural users that performed the incorrect operation pattern, and a second group of one or more of the plural users that performed a different incorrect operation pattern, and the reflection information generation unit generates the reflection information to be reflected in the functions of the devices to be operated by the identified first and second groups.

13. An information processing method comprising:

extracting an operation pattern of each of plural users from operation history information obtained from a plurality of devices to be operated, the operation history information at least including information regarding operation histories of the users and device states;

extracting an incorrect operation pattern from the operation patterns of the plural users, the incorrect operation pattern being an operation pattern caused by incorrect operations performed by the users;

identifying a cause of the incorrect operations from a type of the incorrect operation pattern;

and generating, based on the cause of the incorrect operations, reflection information configured to be reflected in functions of the devices to be operated;

wherein the extracting incorrect operation patterns includes identifying a first group of one or more of the plural users that performed the incorrect operation pattern, and a second group of one or more of the plural users that performed a different incorrect operation pattern, and the generating includes generating the reflection information to be reflected in the functions of the devices to be operated by the identified first and second groups.

* * * * *